（12） United States Patent
Iwatake

(10) Patent No.: US 12,515,324 B2
(45) Date of Patent: Jan. 6, 2026

(54) ROBOT SYSTEM COMPRISING ROBOT INCLUDING TORQUE SENSORS

(71) Applicant: FANUC CORPORATION, Yamanashi (JP)

(72) Inventor: Takahiro Iwatake, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 240 days.

(21) Appl. No.: 18/253,912

(22) PCT Filed: Jan. 12, 2022

(86) PCT No.: PCT/JP2022/000726
§ 371 (c)(1),
(2) Date: May 22, 2023

(87) PCT Pub. No.: WO2022/154011
PCT Pub. Date: Jul. 21, 2022

(65) Prior Publication Data
US 2024/0001548 A1 Jan. 4, 2024

(30) Foreign Application Priority Data
Jan. 18, 2021 (JP) ................................. 2021-005749

(51) Int. Cl.
*B25J 9/16* (2006.01)
(52) U.S. Cl.
CPC .................................. *B25J 9/1633* (2013.01)

(58) Field of Classification Search
CPC ...... B25J 9/1633; B25J 13/087; B25J 13/085; B25J 9/1674; G05B 2219/37431; G05B 2219/40599
See application file for complete search history.

(56) References Cited

U.S. PATENT DOCUMENTS 11,465,285 B2 * 10/2022 Sejimo ................... B25J 9/0009

FOREIGN PATENT DOCUMENTS

| CN | 107378955 A | 11/2017 |
|---|---|---|
| JP | 2019-111597 A | 7/2019 |
| JP | 2020-509342 A | 3/2020 |
| JP | 2020-067295 A | 4/2020 |
| JP | 2020-185647 A | 11/2020 |
| WO | 2015/137038 A1 | 9/2015 |

* cited by examiner

*Primary Examiner* — Dylan M Katz
(74) *Attorney, Agent, or Firm* — HAUPTMAN HAM, LLP

(57) ABSTRACT

This robot system includes a robot that includes torque sensors corresponding to joint axes. The robot system includes a sensor temperature determination unit that determines whether the temperature state of each of the torque sensors is an abnormal or appropriate temperature state on the basis of an output value of a temperature detection unit. The robot system includes an operation command unit that reduces at least one among the speed and the acceleration of a robot drive motor when there is a torque sensor of which the temperature state is an abnormal temperature state and not an appropriate temperature state.

14 Claims, 19 Drawing Sheets

ROBOT SYSTEM COMPRISING ROBOT INCLUDING TORQUE SENSORS

RELATED APPLICATIONS

The present application is a National Phase of International Application No. PCT/JP2022/000726 filed Jan. 12, 2022, which claims priority to Japanese Application No. 2021-005749 filed Jan. 18, 2021.

FIELD

The present invention relates to a robot system including a robot including a torque sensor.

BACKGROUND

In recent years, a cooperation robot for performing work in cooperation with a person has become widely known. The cooperation robot in which contact between a person and a robot is assumed is known, wherein a torque sensor is disposed in a joint portion of the robot in order to detect torque or external force acting on the robot, torque acting on the joint portion is measured, and external force acting on the robot is calculated based on a value of the measured torque. Further, contact with a person is detected by torque or external force acting on the robot, and direct teaching is performed according to torque or force acting from a person.

A torque sensor included in a robot has a temperature changing due to various factors such as a temperature change caused by heat generation of a driving machine by an operation of the robot, a temperature change in a surrounding environment of the robot, and a temperature change caused by heat generation of an internal circuit of the torque sensor. As a result, a value of torque data detected by the torque sensor may not be accurate (for example, see Japanese Unexamined Patent Publication (Kokai) No. 2020-67295A and Japanese Unexamined Patent Publication (Kokai) No. 2019-111597A).

To address such a problem, in a torque sensor, a temperature of a portion that detects a displacement caused by application of torque or a temperature near the portion is measured, and torque data are compensated based on the measured temperature (for example, see Japanese Unexamined Patent Application Publication (Translation of PCT Application) No. 2020-509342A).

Further, when a motor included in a joint axis of a robot is overheated due to an excessive load on driving of the joint axis of the robot and a surrounding temperature of the motor is abnormal, or when an abnormality is detected in torque data detected by a torque sensor included in the joint axis, a robot which stops an operation in the joint axis in which the motor is disposed is known (for example, see International Publication No. WO2015/137038A1).

CITATION LIST

Patent Literature

[PTL 1] Japanese Unexamined Patent Publication (Kokai) No. 2020-67295A
[PTL 2] Japanese Unexamined Patent Publication (Kokai) No. 2019-111597A
[PTL 3] Japanese Unexamined Patent Application Publication (Translation of PCT Application) No. 2020-509342A
[PTL 4] International Publication No. WO2015/137038A1

SUMMARY

Technical Problem

In a robot including a torque sensor that measures torque or force acting on the robot, the airtightness of the robot is often high for the purpose of improved dust resistance, improved water resistance, or as a measure against electric noise for the purpose of improving reliability. In such a case, a temperature of the torque sensor included in a joint axis of the robot may be increased or a temperature may rapidly change in the course of operation of the robot. Further, in the joint portion of the robot, the torque sensor is often Closely attached to a driving unit such as an electric motor, a mechanism unit such as a reduction gear, and the like in such a way as to increase measurement accuracy of torque, and disposed in such a way as to accurately transmit torque or force. As a result, heat in the mechanism unit or the driving unit of the robot may be easily transmitted to the torque sensor.

Further, the torque sensor included in the joint axis of the robot is susceptible to a temperature change of an arm or the mechanism unit such as the reduction gear due to a temperature in a work environment of the robot and a temperature change in a surrounding environment such as a surrounding device, a tool, a hand, or an object to be transported. Further, a load on the joint axis of the robot may be small or great due to dependence on an operation of the robot, and a weight or a position of the center of gravity of an object to be transported by the robot. An influence of a temperature on the torque sensor may greatly change depending on a situation of a load on the joint axis.

Further, a range of a surrounding temperature may be wide from a low-temperature state to a high-temperature state depending on a work environment of the robot. Further, a range of a temperature change due to an operation of the robot may be wide, and a temperature may change in a short time. A temperature state of the torque sensor included in the joint axis of the robot may change in a wide range from a low temperature to a high temperature, and may also greatly change in a short time.

Temperature compensation is performed in order to handle a change in a temperature state of such a torque sensor. However, a temperature state of the torque sensor may not be able to be appropriately measured due to an arrangement of a temperature sensor included in the torque sensor, deterioration of accuracy of the temperature sensor, or the like. Further, an approximate model of a temperature characteristic of the torque sensor in the temperature compensation may not match an actual state depending on a temperature state of the torque sensor, and an error may increase. In this way, an error of a detection value of a temperature may increase, or accuracy itself of the temperature compensation may deteriorate, depending on a temperature state of the torque sensor in which a temperature of the torque sensor changes in a wide range, a temperature greatly changes in a short time, a temperature state of the torque sensor locally changes, or the like. As a result, it may be difficult to appropriately perform the temperature compensation of torque data, and a value of the torque data may not be appropriate.

In this way, an error of an output of the torque sensor may be great depending on a temperature state of the torque sensor, and appropriate torque may not be able to be detected. Further, a temperature of the torque sensor may be abnormal depending on an operation situation of the robot or a situation of a surrounding environment.

Further, there is a case where a decrease in detection accuracy of torque data is not preferable even though a temperature state of the torque sensor is not abnormal and use can continue by contrivance during the use. Further, depending on an aspect of an operation of the robot, there is a case where an excessive load is imposed on the joint portion and the like of the robot and a failure of the robot is accelerated even when compensation by a temperature of torque data can be appropriately performed.

Further, when an operator performs direct teaching, or when the operator performs cooperation work with the robot, and the like, the operator may directly come into contact with the robot in order to stop the robot, change an operation, and change a setting. In this case, since a temperature near the joint axis of the robot or a temperature of the torque sensor included in the joint axis of the robot is not recognized, the robot may have an unexpected temperature, or a deterioration situation of detection accuracy due to a temperature fluctuation of the torque sensor may not be recognized.

For example, when the robot is driven for a long time at a high speed in a mode that is not a cooperation operation, and then used in a mode of performing the cooperation operation, the joint portion and the torque sensor of the robot may have a high temperature. Further, even in the mode of performing the cooperation operation, when an operation having a great load continues for a long time, the joint portion and the torque sensor of the robot may have a high temperature. In such a case, even when there is no abnormality in the torque sensor and an actuator of the robot, it may be hot for a person to contact, detection accuracy of the temperature sensor may deteriorate, and detection accuracy of the torque sensor may decrease.

In this way, even when a temperature of the joint portion of the robot is a temperature that is not a problem for the actuator such as the motor, a temperature state may not be appropriate as a temperature state of the torque sensor of the robot working in cooperation with the operator, and detection accuracy of the torque sensor may deteriorate. Alternatively, even when detection accuracy of the torque sensor has no problem, it may be too hot for the operator to come into contact with the robot, or detection accuracy of the torque sensor may be kept in a good state.

Solution to Problem

One aspect of the present disclosure is a robot system including a robot including a torque sensor corresponding to a joint axis. The robot system includes a torque sensor including a torque detection unit and a temperature detection unit, and a temperature compensation unit that obtains data subjected to temperature compensation, based on an output value of the torque detection unit and an output value of the temperature detection unit. The robot system includes a sensor temperature determination unit that determines whether a temperature state of a torque sensor is an abnormal state and whether a temperature state of a torque sensor is an appropriate temperature state, based on an output value of at least one of the temperature detection unit and the temperature compensation unit. The robot system includes an operation command unit that Changes an operation command in such a way as to stop the robot when there is a torque sensor in which a temperature state of a torque sensor is an abnormal state. The operation command unit changes, when there is a torque sensor in which a temperature state of a torque sensor is neither an abnormal state nor an appropriate temperature state, an operation command of the robot in such a way as to reduce at least one of a speed and acceleration of a joint axis in which the torque sensor is disposed.

Advantageous Effects of Invention

According to one aspect of the present disclosure, a robot system for changing an operation of a robot according to a temperature state of a torque sensor can be provided.

DESCRIPTION OF EMBODIMENTS

A robot system according to an embodiment will be described with reference to FIGS. 1 and 19. In the present invention, "predetermined" means being determined until use or execution. Further, "predetermined" indicates being determined at any timing until needed, for example, being predetermined before use or execution starts, being determined immediately before use or execution, and the like. A predetermined variable, a predetermined constant, a predetermined equation, or the like may be appropriately determined based on specifications of a robot system, a desired result, a situation of the robot system, an experiment result, acquired data, or the like. The robot system according to the present embodiment includes a robot including a torque sensor that detects torque applied to a constituent member such as an arm. In the present invention, a speed or acceleration of a joint axis of the robot is referred to as a speed or acceleration of an operation for driving the joint axis of the robot formed of a rotation axis or a direct-acting axis.

(First Robot System)

Figure 1:
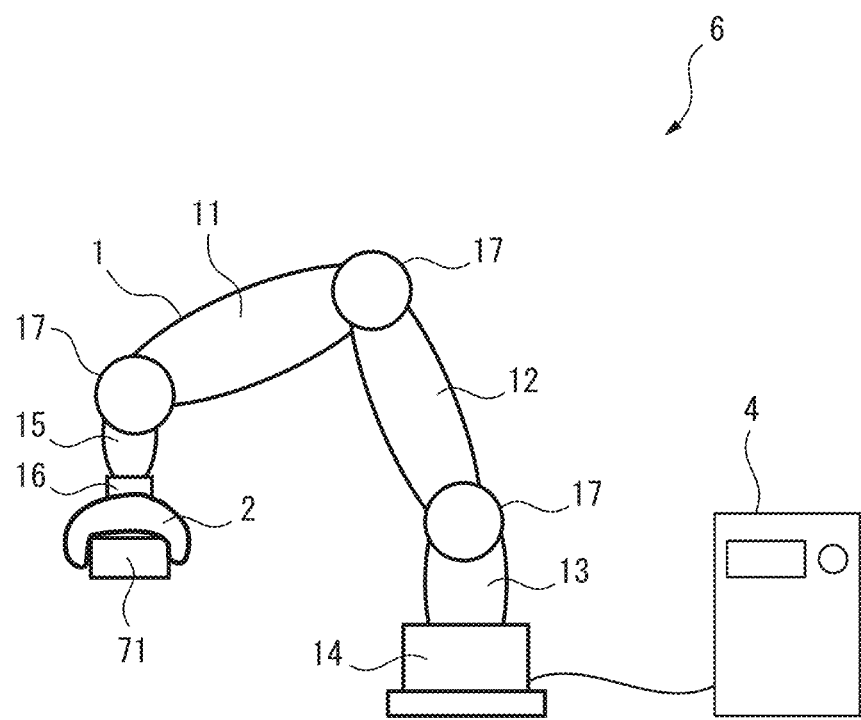
FIG. 1 is a schematic diagram of a robot system according to an embodiment.

FIG. 1 illustrates a schematic diagram of a first robot system according to the present embodiment. A first robot system 6 according to the present embodiment has a function of transporting a workpiece 71. The first robot system 6 includes a hand 2 as a work tool (end effector), and a robot 1 that changes a position and a posture of the hand 2. The robot system 6 includes a controller 4 that controls the robot 1 and the hand 2. The robot 1 according to the present embodiment is a vertically articulated robot including six joint axes (rotation axes). Note that the joint axes is formed of the rotation axis in the present embodiment, but the present invention is not limited to this form. The joint axis may be formed of a direct-acting axis other than the rotation axis.

The robot 1 according to the present embodiment includes a base portion 14 fixed to an installation surface, and a turning base 13 supported by the base portion 14. The turning base 13 is formed in such a way as to rotate with respect to the base portion 14. The robot 1 includes an upper arm 11 and a lower arm 12. The lower arm 12 is rotatably supported by the turning base 13 via a joint portion 17. The upper arm 11 is rotatably supported by the lower arm 12 via the joint portion 17. Further, the upper arm 11 rotates about a rotation axis parallel to a direction in which the upper arm 11 extends.

The robot 1 includes a wrist 15 connected to an end portion of the upper arm 11. The wrist 15 rotatably supported by the upper arm 11 via the joint portion 17. The wrist 15 includes a flange 16 that rotates about a rotation axis along a direction in which the wrist 15 extends. The hand 2 is fixed to the flange 16.

The robot 1 according to the present embodiment is a vertically articulated robot including six joint axis, but the present invention is not limited to this form. A robot in any form that can change at least one of a position and a posture of a work tool can be adopted. For example, a robot having any number of joint axes can be adopted.

The hand 2 according to the present embodiment holds and releases the workpiece 71. The hand 2 holds the workpiece 71 by closing nail portions facing each other. The work tool is not limited to a hand that holds a workpiece. Any work tool can be attached to a robot according to work by a robot system. For example, when a robot system performs arc welding, a welding torch can be attached to a robot.

Figure 2:
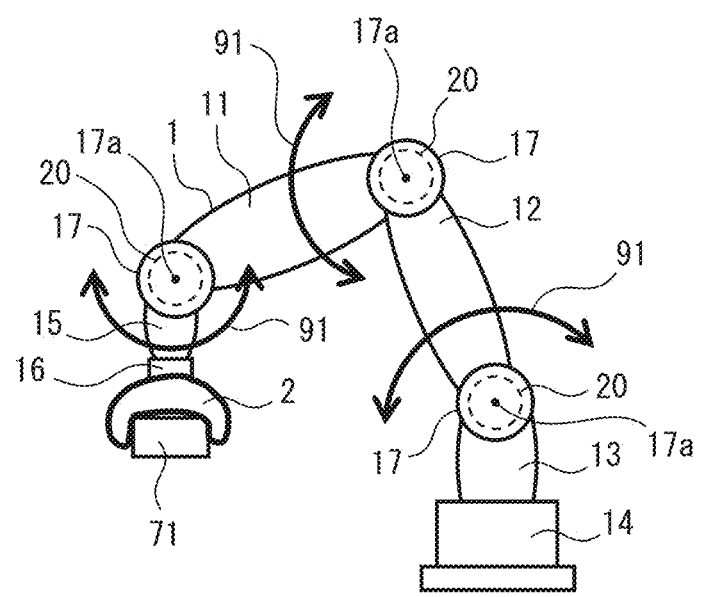
FIG. 2 is a schematic diagram of a robot according to the embodiment.

FIG. 2 illustrates a schematic diagram of a robot according to the present embodiment. With reference to FIGS. 1 and 2, the robot 1 includes a joint axis 17a being a rotation axis of a constituent member such as an arm portion. The robot 1 is formed to include a plurality of the joint axes 17a. A torque sensor 20 that detects torque as indicated by an arrow 91 in a direction around the joint axis 17a is disposed in each of the joint portions 17. The robot 1 according to the present embodiment includes two or more joint axes 17a in which the torque sensor 20 is disposed. In other words, the torque sensor 20 is disposed in two or more joint axes 17a of six joint axes of the robot 1.

In the present embodiment, the torque sensor 20 is attached to each of six joint axes of the robot 1. In other words, six torque sensors 20 are disposed in the robot 1 according to the present embodiment, but the present invention is not limited to this form. The torque sensor may be attached to a minimum joint axes that needs to detect torque.

Note that, as described below, a temperature state of the torque sensor can be determined by a comparison between a value based on an output value of a temperature detection unit included in the torque sensor disposed in one joint axes, and a value based on an output value of the temperature detection unit included in the torque sensor disposed in the other joint axes. However, when the determination is not performed, the torque sensor can be disposed in one or more joint axes of the robot. Further, a force sensor that can detect force or moment as torque or a load cell that can detect force may be attached to the joint axis to which the torque sensor is not attached.

Figure 3:
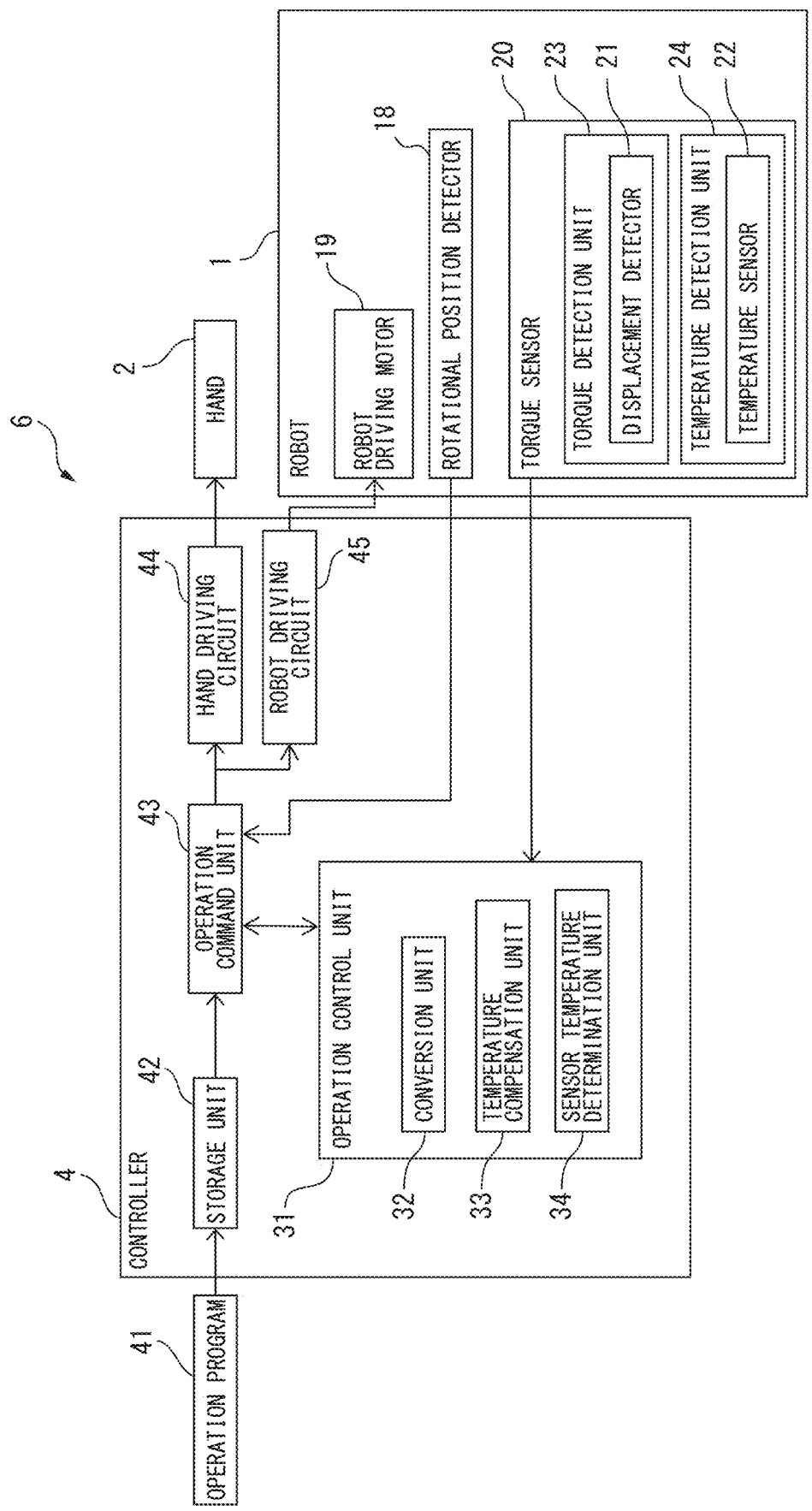
FIG. 3 is a block diagram of a first robot system according to the embodiment.

FIG. 3 illustrates a block diagram of the robot system according to the present embodiment. With reference to FIGS. 1 to 3, the robot 1 includes a robot driving unit that changes a position and a posture of the robot 1. The robot driving unit includes a robot driving motor 19 as an electric motor that drives a constituent member such as an arm. The robot driving unit drives an actuator disposed in the joint axis in such a way as to move a rotational position in each of the joint axes 17a of the robot 1. Note that, when the robot driving unit can drive and displace the joint axis of the robot, the robot driving unit may be formed by any principle or power. Further, when the joint axis is a direct-acting axis, the robot driving unit drives the actuator disposed in the joint axis in such a way as to move a position on the direct-acting axis. The hand 2 includes a hand driving unit that drives the hand 2. The hand driving unit includes a pressure pump, a valve, and the like for driving the claw portions of the hand 2.

The robot system 6 includes the controller 4 that controls the robot 1 and the hand 2. The controller 4 includes an arithmetic processing device (computer) including a central processing unit (CPU) as a processor. The arithmetic processing device includes a random access memory (RAM), a read only memory (ROM), and the like connected to the CPU via a bus. An operation program 41 includes an operation command (statement) that drives the robot 1 and the hand 2. The robot system 6 transports a workpiece by driving based on the operation program 41.

The controller 4 includes a storage unit 42 that stores information. The storage unit 42 stores information about control of the robot 1 and the hand 2. The operation program 41 is stored in the storage unit 42. The storage unit 42 can be formed of a non-transitory storage medium. For example, the storage unit 42 can be formed of a storage medium that can store information, such as a volatile memory, a non-volatile memory, a magnetic storage medium, or an optical storage medium.

The controller 4 includes an operation command unit 43 that transmits an operation command. The operation command unit 43 corresponds to a processor that drives according to the operation program 41. The operation command unit 43 is formed to be able to read information stored in the storage unit 42. The processor reads the operation program 41 and performs control determined by the operation program 41, and thus functions as the operation command unit 43. The robot driving unit is driven based on an operation command of the robot 1 being output from the operation command unit 43, and a rotational position of the robot driving motor 19 in the joint axis of the robot 1 can be changed.

The operation command unit 43 transmits an operation command for driving the robot 1 to a robot driving circuit 45. The robot driving circuit 45 includes an electric circuit that drives the robot driving motor 19. The robot driving circuit 45 supplies electricity to the robot driving motor 19, based on the operation command. Further, the operation command unit 43 transmits an operation command for driving the hand 2 to a hand driving circuit 44. The hand driving circuit 44 includes an electric circuit that drives a hand driving unit. The hand driving circuit 44 supplies electricity to the hand driving unit, based on the operation command.

The robot 1 includes a rotational position detector 18 that outputs axis position data that are a rotational position in the joint axis 17a of the robot 1. The rotational position detector 18 is, for example, formed of an encoder. A position and a posture of the robot 1 can be detected by an output of the rotational position detector 18. The rotational position detector 18 according to the present embodiment is attached to the robot driving motor 19 disposed in association with each joint axis. The rotational position detector 18 is formed in such a way as to detect a rotational angle or a phase when the robot driving motor 19 drives.

The controller 4 according to the present embodiment includes an operation control unit 31 that transmits information for changing an operation to the operation command unit 43, based on an output from the torque sensor 20. The operation control unit 31 includes a conversion unit 32 that converts an output of a displacement detector 21 of the torque sensor 20 into torque data. The operation control unit 31 includes a temperature compensation unit 33 that performs temperature compensation for a value related to torque. Further, the operation control unit 31 includes a sensor temperature determination unit 34 that determines a temperature state of the torque sensor 20.

The operation control unit 31 corresponds to a processor that drives according to the operation program 41. The operation control unit 31 is formed to he able to read information stored in the storage unit 42. The processor reads the operation program 41 and performs control determined by the operation program 41, and thus functions as the operation control unit 31. Further, each unit of the conversion unit 32, the temperature compensation unit 33, and the sensor temperature determination unit 34 included in the operation control unit 31 corresponds to a processor that drives according to the operation program 41. The processor performs control determined by the operation program 41, and thus functions as each unit.

(Torque Sensor)

The torque sensor 20 according to the present embodiment is a sensor disposed in the joint axis 17a of the robot 1. The torque sensor 20 detects moment of a generated force as torque by force acting on a member to which the torque sensor 20 is attached. The torque sensor 20 according to the present embodiment includes a torque detection unit 23 that detects a value related to torque, and a temperature detection unit 24 that detects a value related to a temperature. The torque detection unit 23 includes one or more displacement detectors 21 that detect a value conforming to torque acting on the joint axis 17a of the robot 1. The temperature detection unit 24 includes one or more temperature sensors 22 that detect a temperature of the torque sensor 20. The robot system 6 according to the present embodiment is configured to detect or measure torque acting on the torque sensor 20 disposed in the joint axis 17a of the robot 1, and detect or measure a temperature of the torque sensor 20. In the present embodiment, it is assumed that detection of torque or a temperature includes a measurement of torque or a temperature.

The displacement detector 21 detects a relative displacement of a structural member that constitutes the torque sensor 20 at one or more predetermined places of the torque sensor 20. A value related torque (data related to torque) detected by the torque sensor 20 includes torque data including a value of torque and a value conforming to torque.

For example, a value conforming to torque is a value, such as an output value of the displacement detector 21, from which torque data are obtained by a computation based on a predetermined arithmetic expression such as multiplication by calibration data. For example, when a torque sensor is a strain gauge type formed of a Wheatstone bridge circuit, a value acquired by converting a displacement of the strain gauge into a voltage corresponds to a value conforming to torque. The torque detection unit 23 of the torque sensor 20 illustrated in FIG. 3 outputs an output value of the displacement detector 21 as a value conforming to torque. The conversion unit 32 of the operation control unit 31 disposed in the controller 4 calculates torque data by using an output value of the plurality of displacement detectors 21 and calibration data that associate the output value of the displacement detector 21 and a value of the torque data with each other.

The temperature compensation unit 33 performs temperature compensation on a value related to torque. The temperature compensation unit 33 illustrated in FIG. 3 performs temperature compensation on torque data output from the conversion unit 32. The temperature sensor 22 of the temperature detection unit 24 is disposed in such a way as to detect a temperature of a predetermined portion at one or more places of the torque sensor. The temperature compensation unit 33 compensates for torque data, based on a temperature acquired from one or more temperature sensors 22 and a reference temperature in temperature compensation.

Note that torque data may be calculated after temperature compensation is performed on a value conforming to torque. In other words, the temperature compensation unit 33 may calculate a value conforming to torque subjected to temperature compensation, based on a value conforming to torque being detected by the torque detection unit 23, temperature data about the torque sensor 20 being output from the temperature detection unit 24, and a reference temperature in temperature compensation. Then, the conversion unit 32 may calculate torque data including torque, based on a value conforming to torque subjected to temperature compensation and calibration data. In such a manner, either conversion from a value conforming to torque into torque data or temperature compensation may be performed first.

Furthermore, at least one of the conversion unit 32 and the temperature compensation unit 33 may be disposed in the torque sensor 20 instead of the operation control unit 31 of the controller 4. The torque sensor 20 can include an arithmetic processing device including a processor. Then, the processor of the torque sensor can function as the conversion unit and the temperature compensation unit.

For example, when the torque detection unit 23 of the torque sensor 20 includes the conversion unit 32, the torque detection unit 23 can calculate torque data by using an output value of the plurality of displacement detectors 21 and calibration data that associate the output value of the displacement detector 21 and a value of the torque data with each other. The torque data are transmitted from the torque sensor 20 to the operation control unit 31.

Further, when the torque sensor 20 includes the temperature compensation unit 33, the torque sensor 20 can perform temperature compensation on a value conforming to torque being output from the displacement detector 21, based on a temperature acquired from the temperature sensor 22 and a reference temperature related to the temperature compensation. The value conforming to the torque subjected to the temperature compensation is transmitted from the torque sensor 20 to the operation control unit 31.

When the torque sensor 20 includes the conversion unit 32 and the temperature compensation unit 33, the torque sensor 20 can perform conversion from a value conforming to torque into torque data and temperature compensation. Then, the torque data subjected to the temperature compensation are transmitted from the torque sensor 20 to the operation control unit 31.

Further, at least one of the conversion unit 32 and the temperature compensation unit 33 may be disposed in a device different from the controller 4 and the torque sensor 20. For example, at least one of the conversion unit 32 and the temperature compensation unit 33 may be disposed in an arithmetic processing device different from the controller. In such a manner, in the different arithmetic processing device including a processor, at least one of conversion from a value conforming to torque into torque data and temperature compensation may be performed.

Furthermore, the temperature compensation unit 33 may have a function of the conversion unit 32. In other words, the temperature compensation unit may simultaneously perform conversion into torque data and temperature compensation, based on a value conforming to torque being detected by the displacement detector, calibration data for conversion into the torque data, temperature data output from the temperature detection unit, and a reference temperature in the temperature compensation. In this case, the temperature compensation unit can calculate torque data subjected to temperature compensation from an output value of the displacement detector.

The reference temperature being a temperature referred when temperature compensation is performed on a value related to torque is preferably a temperature when calibration of the torque sensor is performed or a temperature close to the temperature. As the reference temperature, for example, approximately 25° C. being room temperature can be adopted.

The temperature detection unit 24 including the temperature sensor 22 outputs representative temperature data about the torque sensor 20, temperature data about each position of a portion constituting the torque sensor, or a value conforming to the temperatures. A value conforming to a temperature is a value substituted for temperature data or a value that can be converted into temperature data. For example, a value conforming to a temperature is a value that can be used instead of temperature data, a value that can be converted into temperature data by a predetermined arithmetic expression, a value converted for convenience to transfer of data, a value that changes according to a temperature, or the like.

The temperature sensor 22 is preferably disposed at a place for convenience to detect a temperature of the torque sensor 20, a place for convenience to perform temperature compensation, or the like. The temperature sensor 22 may be disposed in a portion where the plurality of displacement detectors 21 are disposed or near the plurality of displacement detectors 21.

The torque sensor according to the present embodiment is a sensor that detects torque around one rotation axis, but the present embodiment is not limited to this form. The torque sensor may be a sensor including a force detection unit that can also detect force. The torque sensor may be a sensor that detects torque acting around the joint axis. The torque sensor may be formed of, for example, a force sensor that can detect a component of three-axis or six-axis force and torque.

Detection of torque and force can be detected by a detector that detects a physical amount that changes according to a relative displacement of a structural member of a sensor. At this time, a detection unit may be formed in such a way that a change amount for detecting a relative displacement of a structural member is a change amount of an electric charge, inductance, light, an ultrasonic wave, magnetism, or the like that changes according to the relative displacement. Further, torque and force may be detected by disposing an optical sensor in such a way as to detect a change of a position of a corresponding point on an image that changes according to a relative displacement of a structural member, or image information. In such a case, a physical amount that changes according to a relative displacement of a structural member of a sensor corresponds to a value conforming to torque.

For example, the displacement detector can be formed of a Wheatstone bridge circuit formed of a strain gauge in such a way as to convert a relative displacement of a structural member constituting the torque sensor into a voltage and output the voltage, in this case, the displacement detector can output a displacement of the strain gauge as a voltage. Alternatively, the displacement detector may be configured to output a displacement of capacitance as a voltage.

Furthermore, in a detection method of torque of the torque detection unit 23 according to the present embodiment, the displacement detector 21 detects a relative displacement of a structural member constituting the torque sensor. Then, the detected relative displacement is converted into torque, but the present embodiment is not limited to this form. The torque sensor may be a sensor of any detection method as long as torque is detected.

The temperature sensor 22 of the temperature detection unit 24 is configured to detect, by using an element of a thermistor, a thermocouple, a platinum resistor, or the like, a change in resistance value, electromotive force, or the like generated by a change in physical properties by temperature, and convert the change into temperature data. The torque sensor may be configured to include two or more temperature sensors, and an output of the plurality of temperature sensors may be used in detection of a temperature of the torque sensor.

The temperature detection unit 24 outputs a detection value of the temperature sensor 22, or a value obtained from a value detected by the temperature sensor 22. Further, when two or more temperature sensors are present, the temperature detection unit may Output a detection value of the plurality of temperature sensors, or the temperature detection unit may include an arithmetic processing device including a processor and output one or more values obtained from a value detected by the plurality of temperature sensors.

For example, when the plurality of temperature sensors are disposed in the torque sensor, the temperature detection unit can calculate and output an average value of outputs of the plurality of temperature sensors. Alternatively, the temperature detection unit can calculate an average of outputs of the temperature sensors by providing a weight according to a position of the temperature sensors, and calculate and output one representative value. Alternatively, the temperature detection unit may select and output one representative value by providing a weight to outputs of the plurality of temperature sensors. For example, a medium value of outputs of the plurality of temperature sensors may be selected.

Further, the temperature detection unit may calculate, for a plurality of temperature sensors disposed near the displacement detector, one representative value with outputs of the plurality of temperature sensors as one whole. Then, the temperature compensation unit and the sensor temperature determination unit may use the value as temperature data near the displacement detector.

Further, two or more temperature sensors having different degrees of detection accuracy according to a temperature may be disposed in the temperature detection unit of the torque sensor. Then, an output of the temperature sensors may be selected in such a way as to maintain a high degree of the detection accuracy of a temperature even when the temperature of the torque sensor changes. At this time, at least two or more temperature sensors preferably have temperature characteristics in such a way that degrees of the detection accuracy are different from each other according to a temperature, and temperature ranges in which a degree of the detection accuracy of a temperature is equal to or more than a predetermined threshold value are different.

The temperature detection unit can estimate a range in which a temperature of a predetermined portion of the torque sensor is present, based on an output of two or more temperature sensors included in the torque sensor. The temperature detection unit may output a temperature of a predetermined portion of the torque sensor as a detection value, based on an estimated temperature range and an output of the temperature sensor. For example, the temperature detection unit can estimate, as a range in which a temperature of a predetermined portion is present, a predetermined range including a medium value of outputs of the plurality of temperature sensors. Then, one of the outputs of the plurality of temperature sensors present in the predetermined range can be selected. For example, the medium value present in the predetermined range can be selected.

Alternatively, a range in which a temperature of a predetermined portion of the torque sensor is present can be estimated based on an output of two or more temperature sensors included in the torque sensor, and a weight can be set for outputs of the plurality of temperature sensors. For example, an average value can be calculated by multiplying the output of each of the temperature sensors by a coefficient as the weight. In this case, the temperature detection unit can change the weight of the output of the temperature sensor according to the range in which the estimated temperature of the torque sensor is present. The temperature detection unit can output the calculated value as a value of the temperature of the predetermined portion of the torque sensor. At this time, a weight or a coefficient of the output of the temperature sensor having excellent detection accuracy in the range in which the temperature is present may be set to be relatively great.

Note that arithmetic processing based on a detection value of the plurality of temperature sensors in the temperature detection unit described above may be performed by the temperature compensation unit or the sensor temperature determination unit. In other words, when two or more temperature sensors are present, the temperature detection unit outputs a detection value of the plurality of temperature sensors. Then, the temperature compensation unit or the sensor temperature determination unit may perform a computation related to a temperature of a predetermined portion of the torque sensor, based on the value detected by the plurality of temperature sensors.

Further, the temperature sensor having a different excellent temperature characteristic is preferably disposed according to a position of the displacement detector that detects a relative displacement of a structural member constituting the torque sensor. Alternatively, the plurality of temperature sensors having temperature characteristics different from each other may by attached near the same position of a plurality of places of the torque sensor. Alternatively, the temperature sensors having temperature characteristics different from each other may be disposed in positions different from each other of the torque sensor.

(Temperature Compensation Unit)

Next, the temperature compensation unit 33 that performs temperature compensation on a value related to torque will be described with reference to FIG. 3. The temperature compensation unit 33 compensates for torque data or a value conforming to torque according to a temperature. Herein, description is given by taking, as an example, torque data including a value of torque as a value related to torque. Temperature compensation can also be performed on a value conforming to torque by a method similar to that of torque data.

The temperature compensation unit 33 performs temperature compensation on torque data by using a predetermined arithmetic expression of temperature compensation. The temperature compensation unit 33 may be able to calculate a value related to torque corrected by a temperature by a predetermined arithmetic expression of temperature compensation regardless of an aspect such as temperature compensation of torque data or temperature compensation of a value conforming to torque.

When torque data subjected to temperature compensation are obtained, a reference temperature in the temperature compensation being a temperature as a reference may be predetermined. The reference temperature is preferably a temperature when calibration of the torque sensor is performed or a temperature close to the temperature. Further, the reference temperature may be a temperature according to a type of the torque sensor, a temperature of a place where the robot is installed, or a temperature according to a temperature state of the joint portion of the robot including the torque sensor. Alternatively, the reference temperature may be a plurality of temperatures when calibration is performed at a plurality of temperatures in consideration of a temperature and the like at which the torque sensor is used. The reference temperature may be a temperature according to the torque sensor, or a temperature in consideration of a temperature state of the torque sensor. Further, calibration data used for obtaining a reference temperature or torque data may be changed according to a situation of a temperature.

Further, when temperature compensation is performed in the temperature detection unit, the temperature detection unit may measure and output a temperature of a place of the torque sensor where the displacement detector is installed. The temperature compensation unit may obtain torque data subjected to temperature compensation, based on a temperature of a place where the plurality of displacement detectors are installed, a reference temperature in the temperature compensation, an output value of the plurality of displacement detectors, and calibration data. Alternatively, torque data subjected to temperature compensation may be obtained based on an output value of the plurality of displacement detectors, a value of a representative temperature of the torque sensor, a coefficient according to the temperature compensation, and calibration data. Alternatively, torque data subjected to temperature compensation may be obtained by multiplying an output of the plurality of displacement detectors by calibration data in consideration of the temperature compensation.

In the temperature compensation unit 33, an arithmetic expression of temperature compensation used when the temperature compensation is performed on a value related to torque may be any expression as long as the value related to the torque being subjected to the temperature compensation can be obtained from an output value of the torque detection unit, an output value of the temperature detection unit, a reference temperature in the temperature compensation, and the like.

First, an example of an arithmetic expression that performs temperature compensation on a value (value conforming to torque) of the displacement detector 21 being output from the torque detection unit 23 will be described. As in the following expression (1), an output value of the displacement detector subjected to temperature compensation can be calculated from each output value of the displacement detector 21.

$$Pb = (1 + \alpha 1 \times (Tc - Tr) + \alpha 2 \times (Tc^2 - Tr^2)) \times (Pa + \alpha 3 \times (Tc - Tr) + \alpha 4 \times (Tc^2 - Tr^2)) \quad (1)$$

Pa: Output value of the displacement detector before temperature compensation
Pb: Output value of the displacement detector after temperature compensation
Tc: Current temperature
Tr: Reference temperature
$\alpha 1, \alpha 2, \alpha 3, \alpha 4$: Coefficient In this way, torque data subjected to temperature compensation is obtained by multiplying an output of each displacement detector subjected to the temperature compensation by calibration data. At this time, an arithmetic expression of temperature compensation according to a temperature characteristic of each displacement detector is preferably used in such a way that temperature compensation is appropriately performed on an output value of the displacement detector 21. A coefficient and a constant term of the arithmetic expression are preferably calculated in advance from a plurality of pieces of data. The arithmetic expression is preferably determined in such a way that a value subjected to temperature compensation is appropriately calculated when current changing temperature data are given.

Next, an example of performing temperature compensation on torque data obtained by multiplying an output value of each displacement detector 21 by calibration data will be described. As in the following expression (2), torque data subjected to temperature compensation can be calculated.

$$TRb = (1 + \alpha 1 \times (Tc - Tr) + \alpha 2 \times (Tc^2 - Tr^2)) \times (TRa + \alpha 3 \times (Tc - Tr) + \alpha 4 \times (Tc^2 - Tr^2)) \quad (2)$$

TRa: Torque data before temperature compensation
TRb: Torque data after temperature compensation
Fc: Current temperature
Tr: Reference temperature
$\alpha 1, \alpha 2, \alpha 3, \alpha 4$: Coefficient When torque data are compensated, an arithmetic expression of temperature compensation according to a temperature characteristic of torque data detected based on an output of the torque sensor is preferably used in such a way that temperature compensation is appropriately performed on an output value of the torque data. A coefficient and a constant term of the arithmetic expression are preferably determined in such a way as to have an accurate compensated value based on a reference temperature and a current temperature.

The temperature compensation according to the present embodiment is compensation for a displacement by a temperature change in regard to an output of the displacement detector, and compensates for a displacement other than a displacement by external force. Such a coefficient and a constant term of the arithmetic expression can be set by various methods. For example, a set of data of a theoretical output value of the displacement detector and an actual output value of the displacement detector is generated at a plurality of temperatures. Then, a coefficient and a constant of the arithmetic expression can be calculated in such a way as to reduce an error between a value calculated by the arithmetic expression and an actual value, based on the set of the data.

Herein, a value according to temperature compensation in the present embodiment can be a difference between a current temperature and a reference temperature in the temperature compensation, a coefficient or a constant term used in an expression of the temperature compensation at a temperature at which the temperature compensation is performed, and a value obtained halfway in a calculation process of the temperature compensation. Further, a value according to temperature compensation can be a difference or a ratio at which a coefficient or a constant term used in an expression of the temperature compensation or a value obtained halfway changes by the temperature compensation. A value according to temperature compensation may be a difference or a ratio between an output value of each displacement detector subjected to the temperature compensation and an output value of each displacement detector without being subjected to the temperature compensation, a difference or a ratio between torque data subjected to the temperature compensation and torque data without being subjected to the temperature compensation, and the like. A value according to temperature compensation may be any value as long as the value is a value related to a coefficient, an output value, or the like in the temperature compensation, and a value from which an effect or an influence of the temperature compensation is confirmed.

Note that the temperature compensation unit may be disposed inside the torque sensor, and may output torque data and temperature data of each torque sensor subjected to temperature compensation. Further, when the temperature compensation unit is included in the torque sensor, the sensor temperature determination unit may be disposed inside each torque sensor. In other words, a determination result of a temperature of the torque sensor may be output from the torque sensor.

Further, the temperature compensation unit may be disposed in a device disposed in the robot system in such a way as to be disposed in the integrally included controller or robot driving unit inside or outside the robot. In this case, an output of each torque sensor may be input to the controller and the like, and the temperature compensation unit included in the controller and the like may perform temperature compensation on a value related to torque, based on temperature data and a value related to torque that are outputs of each torque sensor. Note that, when the temperature compensation unit is included in the controller and the like, the sensor temperature determination unit may be further included, and a determination result of a temperature state of the torque sensor may be output.

(Sensor Temperature Determination Unit)

The sensor temperature determination unit 34 determines whether a temperature state in the torque sensor 20 disposed in the joint axis 17a of the robot 1 is an abnormal state, and further determines whether the temperature state is an appropriate temperature state when the temperature state in each torque sensor 20 is not the abnormal state. As a temperature of the abnormal state of the torque sensor 20, for example, a temperature equal to or higher than 80° C. can be adopted. Further, as a temperature of the appropriate temperature state of the torque sensor, for example, a temperature equal to or lower than 40° C. can be adopted.

A determination of a temperature stale of each torque sensor determines whether a state is abnormal in detection of torque acting on the torque sensor, or whether a state that is not abnormal is appropriate. Further, a determination of a temperature state determines whether a state is abnormal and whether a state that is not abnormal is an appropriate temperature state, as a temperature state of the torque sensor when an operator comes into contact with the joint axis included in the torque sensor. A determination of a temperature state has a purpose of determining whether the temperature state is a state related to a temperature of the torque sensor as illustrated next.

The determination of the temperature state is determined based on whether torque data detected by the torque sensor have a value different from a value of torque actually acting on the torque sensor due to a temperature state of the torque sensor, whether a degree of the difference falls within an allowable range, or the like. Further, whether an output of the temperature detection unit that detects a temperature of the torque sensor has a value different from a value representing an actual temperature state of the torque sensor is determined, or whether a degree of the difference falls within an allowable range is determined. Further, whether a state related to a temperature of the torque sensor is a state where a correct value cannot be calculated in calculation of torque data subjected to temperature compensation or is a state where a difference from a correct value is increased is determined.

Further, whether a state related to a temperature of the torque sensor may be a state where a correct value cannot be calculated in calculation of torque data subjected to temperature compensation, or whether the state is predicted is determined. Further, whether the state may be a state where a difference from a correct value is increased, or whether the state is predicted is determined. For example, whether a value of a change (change amount) of a temperature state of the torque sensor is great, whether a temperature state of the torque sensor approaches a worse state, whether a difference in temperature measured at a plurality of places inside the torque sensor is great, and whether a state is an uneven state are determined. Further, whether a temperature of the joint portion of the robot is in a hot state for an operator to contact, whether a temperature of the joint portion is greatly different depending on a portion of the joint axis of the robot, and the like are determined based on a temperature state of the torque sensor included in the joint axis of the robot.

The sensor temperature determination unit 34 determines whether a situation is desired to change an operation of the robot in such a way as to improve a temperature state of the torque sensor by such a determination of a temperature state of the torque sensor. Then, when it is desired to change the operation of the robot, the sensor temperature determination unit can change the operation of the robot, and notify an operator of a state.

The sensor temperature determination unit 34 determines, for each torque sensor 20, whether a temperature state of the torque sensor is an abnormal state under a predetermined determination condition, based on at least one of an output value of the temperature detection unit 24 included in the torque sensor 20 and a value according to temperature compensation of torque data by the temperature compensation unit 33. The sensor temperature determination unit 34 determines whether the temperature state of the torque sensor is an appropriate temperature state by a different predetermined determination condition when the temperature state of the torque sensor is not an abnormal state. Further, the sensor temperature determination unit 34 may determine whether a temperature state of the torque sensor is an abnormal state by comparing, with a value in the other torque sensor, at least one of an output value of the temperature detection unit included in the torque sensor and a value according to temperature compensation of torque data by the temperature compensation unit, and may further determine whether the temperature state of the torque sensor is an appropriate temperature state.

A value based on an output value of the temperature detection unit included in the torque sensor indicates, for an output of the temperature detection unit included in the torque sensor or each temperature sensor disposed in the temperature detection unit, a value of a change in terms of time or a value calculated by using a value calculated based on a value for each measured position. A value based on an output value of the temperature detection unit includes an output value of the temperature detection unit, a differential value of time of an output value of the temperature detection unit, and a value of a change (change amount) in terms of time in a predetermined time. A value based on an output value of the temperature detection unit includes an output value according to a measured position of the temperature sensor constituting the temperature detection unit. When a plurality of the temperature sensors constituting the temperature detection unit are present, a value based on an output value of the temperature detection unit includes a difference between one temperature sensor and the other temperature sensor, a differential value of time of a difference from the other temperature sensor, and a value of a change in terms of time in a predetermined time of a difference from the other temperature sensor. Further, a value based on an output value of the temperature detection unit includes a differential value of time of the temperature sensor constituting the temperature detection unit, and a value of a change in terms of time in a predetermined time.

Further, a value based on a value according to temperature compensation of torque data by the temperature compensation unit is a value related when the torque data subjected to the temperature compensation are obtained. A value based on a value according to temperature compensation is a value obtained from a result of the temperature compensation or from a value changed by the temperature compensation in a process of a computation of the temperature compensation. For example, a value based on a value according to temperature compensation includes a difference or a ratio between a value of torque data before the temperature compensation and a value after the temperature compensation, a difference or a ratio between a coefficient or a constant term before the temperature compensation and a coefficient or a constant term after the temperature compensation for a coefficient or a constant term in an arithmetic expression of the temperature compensation, a difference or a ratio between a value before the temperature compensation and a value after the temperature compensation of a value detected by the displacement detector, a value obtained from a value before the temperature compensation and a value after the temperature compensation in calibration data, and the like.

For a coefficient or a constant term in an arithmetic expression of temperature compensation, an example of a coefficient or a constant term before the temperature compensation and a coefficient or a constant term after the temperature compensation will be described herein. In the expression (1) described above, the expression (I) is changed to the following expression (3) when a term of (Tc−Tr) is a constant T1 and a term of ($Tc_2-Tr_2$) is a constant T2.

$$Pb=(1+α1×T1+α2×T2)×(Pa+α3×T1+α4×T2) \quad (3)$$

Furthermore, the expression (3) is represented by the following expression (4) when a term of (1+α1×T1+α2×T2) is represented by a constant γ1, a term of (α3×T1+α4×T2) is represented by a constant γ2, and (γ1×γ2) is represented by γ3.

$$Pb=γ1×Pa+γ3 \quad (4)$$

From the expression (4), the output value Ph of the displacement detector after the temperature compensation is performed with respect to the output value Pa of the displacement detector before the temperature compensation is performed can be represented by (γ1×Pa+γ3). In the arithmetic expression of the expression (4), a coefficient of the arithmetic expression in a temperature after the temperature compensation is γ1, and a constant term in a temperature after the temperature compensation is γ3. In contrast, since an output value of the displacement detector before the temperature compensation is Pa, a coefficient of the arithmetic expression in a temperature before the temperature compensation is 1, and a constant term in a temperature before the temperature compensation is 0. By using the coefficient or the constant term, a difference or a ratio between a coefficient of the arithmetic expression in the temperature before the temperature compensation and a coefficient of the arithmetic expression in the temperature after the temperature compensation can be calculated. Alternatively, a difference or a ratio between a constant term of the arithmetic expression in the temperature before the temperature compensation and a constant term of the arithmetic expression in the temperature after the temperature compensation can be calculated.

As the coefficient or the constant term in the arithmetic expression of the temperature compensation, γ1, γ2, and γ3 described above can be used. Alternatively, as the coefficient or the constant term in the arithmetic expression, (α1×T1), (α2×T2), (α3×T1), (α4×T2), and the like can be used.

Next, a predetermined determination condition may be a condition where a temperature state of the torque sensor is determined according to a value changed by a predetermined temperature state of the torque sensor. The predetermined determination condition includes a comparison between a value used for a determination and a predetermined threshold value, or a comparison between a value calculated for a determination and a predetermined threshold value. The predetermined determination condition includes a determination whether a plurality of conditions hold true, or a comparison between a score calculated by setting a weight for each of a plurality of conditions and a predetermined threshold value.

A condition used for a determination whether a temperature state of the torque sensor is an appropriate temperature state may be a condition where a threshold value in a determination condition is a different value for a condition used for a determination whether a temperature state of the torque sensor is an abnormal state. Alternatively, not only a threshold value in a determination condition but also a value related to a temperature state of the torque sensor used in the determination condition, a determination method, a compared threshold value, a coefficient, or the like may be set to a different value.

In the determination whether a temperature state of the torque sensor is an abnormal state, an output value of the temperature detection unit included in the torque sensor, a value of a change in a predetermined time of an output value of the temperature detection unit, or a value according to temperature compensation of torque data by the temperature compensation unit may be used. In the determination whether a temperature state of the torque sensor is an appropriate temperature state, an output value of the temperature detection unit included in the torque sensor, or an output value of the temperature detection unit and a value of a change in a predetermined time of the output value of the temperature detection unit may be used.

The sensor temperature determination unit may use a determination condition according to a portion of the joint axis provided with the torque sensor, and a determination value in the determination whether a temperature state of the torque sensor is an abnormal state. For example, by depending on a portion of the joint axis provided with the torque sensor, there is a case where specifications or performance of the torque sensor is different, a case where a load or a usage frequency of the joint portion is different, a case where a frequency with which an operator or a surrounding object is in contact is different, a case where a risk of contact with an operator or a surrounding object is different, or a case where a temperature state allowed by an operator or a surrounding object is different. In this way, when a determination reference of a temperature state of each torque sensor is different, whether a temperature state of the torque sensor is an abnormal state can be determined according to a portion of the joint axis provided with the torque sensor.

Similarly to the control, the sensor temperature determination unit may use a determination condition according to a portion of the joint axis provided with the torque sensor, and a determination value in the determination whether a temperature state of the torque sensor is an appropriate temperature state. By the control, when a determination reference of a temperature state of the torque sensor is different, the temperature state of the torque sensor is an appropriate temperature state can be determined according to a portion of the joint axis provided with the torque sensor.

The sensor temperature determination unit determines whether a temperature state of the torque sensor is an abnormal state by using an abnormal state determination condition that determines an abnormal state of the torque sensor. The abnormal state determination condition includes a determination condition of a comparison between an output value of the temperature detection unit included in the torque sensor and a predetermined threshold value, a determination condition of a comparison between an output value of the temperature detection unit in a predetermined time and a predetermined threshold value, a determination condition of a comparison between a compensation value of torque data subjected to temperature compensation by the temperature compensation unit and a predetermined threshold value, and a determination condition of a comparison between an output value of the temperature detection unit of the torque sensor included in one joint axis and an output value of the temperature detection unit of the torque sensor included in the other joint shaft. The abnormal state determination condition can be formed of at least one determination condition of the determination conditions and a predetermined determination value.

Furthermore, when a temperature state of the torque sensor is not an abnormal state, the sensor temperature determination unit may determine whether the temperature state of the torque sensor is an appropriate temperature state by using at least one determination condition of determination conditions prepared separately from a determination condition of the abnormal state, and an appropriate temperature state determination condition formed of a predetermined determination value different from a determination value of the abnormal state. The determination of the appropriate temperature state can be determined by a method similar to that of the determination of the abnormal state.

In a determination condition of a comparison between an output value of the temperature detection unit included in the torque sensor and a predetermined threshold value, whether the output value of the temperature detection unit exceeds the predetermined threshold value is determined. The sensor temperature determination unit can determine an abnormal state when the output value of the temperature detection unit exceeds the predetermined threshold value. Further, the sensor temperature determination unit can determine an appropriate temperature state when the output value of the temperature detection unit is equal to or less than the predetermined threshold value.

The output value of the temperature detection unit may be a representative temperature of the torque sensor, a temperature output from the temperature sensor disposed at a place of the displacement detector in the torque sensor, a temperature output from the plurality of temperature sensors disposed in the torque sensor, or the like.

In a determination condition of a comparison between a value of a change of an output value in a predetermined time of the temperature detection unit provided in the torque sensor and a predetermined threshold value, a change amount of an output value of the temperature detection unit when a predetermined time is reduced can be adopted, or a change amount of an output value of the temperature detection unit when a predetermined time is increased can be adopted. Further, a change amount of an output value of the temperature detection unit being acquired at a time of an end of a predetermined operation repeated by the robot, at a time of a pause, or the like may be adopted. The sensor temperature determination unit can determine an abnormal state when the value of the change of the output value in the predetermined time of the temperature detection unit exceeds the predetermined threshold value. Further, the sensor temperature determination unit can determine an appropriate temperature state when the value of the change of the output value in the predetermined time of the temperature detection unit is equal to or less than the predetermined threshold value.

In a determination condition of a comparison between a compensation value of torque data subjected to temperature compensation by the temperature compensation unit and a predetermined threshold value, magnitude of a degree of a correction amount of the torque data by the temperature compensation can be monitored. When torque acting on the joint portion by an operation of the robot is great and a temperature of the torque sensor is high, the compensation value of the torque data by the temperature compensation is greater than the predetermined threshold value. In this case, an abnormal state in which an error of the torque data is increased or may be increased due to deterioration of a temperature state of the torque sensor can be detected. The compensation value of the torque data herein may be any value as long as the value is a value calculated from torque data subjected to the temperature compensation and torque data without being subjected to the temperature compensation. For example, the compensation value of the torque data is a difference or a ratio between torque data subjected to the temperature compensation and torque data without being subjected to the temperature compensation, and the like. Further, the sensor temperature determination unit can determine an appropriate temperature state when the compensation value of the temperature compensation of the torque data is equal to or less than the predetermined threshold value.

In a determination condition of a comparison between an output value of the temperature detection unit in the torque sensor included in one joint shaft of the robot and an output value of the temperature detection unit in the torque sensor included in the other joint shaft, an abnormal state is determined when the output value of the temperature detection unit included in the torque sensor is greatly different from a temperature state of the torque sensor included in the other joint shaft. An appropriate temperature state is determined when the output value of the temperature detection unit included in the torque sensor is substantially the same as a temperature state of the torque sensor included in the other joint shall. A comparison with the torque sensor of the other joint shaft may be a comparison with the torque sensor of a predetermined joint shaft, a comparison with the plurality of torque sensors, or a comparison with all the other torque sensors.

A predetermined threshold value (determination value) used in each determination condition is preferably set according to a situation or a determination purpose when a temperature state of the torque sensor is detected as an abnormal state or when a temperature state of the torque sensor is detected as an appropriate temperature state. Further, which determination condition is used when a plurality of determination conditions are present, and a determination that a temperature state of the torque sensor is an abnormal state or an appropriate temperature state when which of a plurality of determination conditions hold true at the same time are preferably set in advance. Further, a predetermined threshold value used in each determination condition is preferably set in advance in such a way as to be a value with which a determination indicated next can be performed.

As described above, the sensor temperature determination unit determines whether torque data detected by the torque sensor have a value different from a value of torque actually acting on the torque sensor due to a temperature state of the torque sensor, whether a degree of the difference falls within an allowable range, or the like. Further, whether an output of the temperature detection unit that detects a temperature of the torque sensor has a value different from a value indicating an actual temperature state of the torque sensor is determined, or whether a degree of the difference falls within an allowable range is determined.

Further, the sensor temperature determination unit determines whether a state related to a temperature of the torque sensor is a state where a correct value cannot be calculated in calculation of torque data subjected to temperature compensation or is a state where a difference from a correct value is increased is determined. Further, the sensor temperature determination unit determines whether a state is a specific state such as a state where a change amount of a temperature state of the torque sensor is great, a state where a temperature state of the torque sensor is becoming worse, a state where a difference in temperature measured at a plurality of places inside the torque sensor is great, and an uneven state. The sensor temperature determination unit determines whether a temperature state of the torque sensor in the specific state may be a state where a correct value cannot be calculated in calculation of torque data subjected to temperature compensation, or whether the state is predicted. Alternatively, the sensor temperature determination unit determines whether the state may be a state where a difference from a correct value is increased, or whether the state is predicted.

A predetermined threshold value used in each determination condition is preferably set according to a determination condition, a characteristic of the torque sensor, a kind of the torque sensor, or a portion of the joint shaft of the robot provided with the torque sensor. Further, the predetermined threshold value is preferably set in consideration of a temperature of a surrounding environment such as a temperature in a work environment of the robot, a temperature of a surrounding device, a temperature of the tool, a temperature of the hand, or a temperature of an object to be transported. Furthermore, the predetermined threshold value is preferably set according to an operation situation of the robot in consideration of a load situation in the joint axis such as an operation of each joint axis or a weight and a position of the center of gravity of an object to be transported.

The sensor temperature determination unit may be configured to determine whether a temperature state of the torque sensor is an abnormal state or an appropriate temperature state by a combined condition when a determination is performed in a plurality of determination conditions, based on an output value of the temperature detection unit included in the torque sensor and a value according to temperature compensation of torque data by the temperature compensation unit.

For example, the sensor temperature determination unit may be configured to perform determination whether a temperature state of the torque sensor is an abnormal state or a determination whether a temperature state of the torque sensor is an appropriate temperature state when at least one or more predetermined conditions is satisfied among a condition where an output value of the temperature detection unit included in the torque sensor is not within a predetermined threshold value, a condition where a value of a change of an output value in a predetermined time of the temperature detection unit is not within a predetermined threshold value, a condition where a value subjected to temperature compensation (a value changed by temperature compensation) with respect to torque data detected by the torque detection unit as a value according to the temperature compensation of the torque data by the temperature compensation unit is not within a predetermined threshold value, and a condition where a coefficient according to temperature compensation with respect to torque data detected by the torque detection unit is not within a predetermined threshold value.

The sensor temperature determination unit may be configured to perform a determination whether a temperature state of the torque sensor is an abnormal state or a determination whether a temperature state of the torque sensor is an appropriate temperature state by comparing, with a predetermined threshold value, a value based on an output value of the temperature detection unit included in the torque sensor, such as a temperature in the torque sensor and a value of a change in a predetermined time of the temperature in the torque sensor.

Further, when the plurality of temperature sensors are included in the torque sensor, a value based on an output value of the temperature detection unit included in the torque sensor includes a temperature at a plurality of places of the torque sensor, a value of a change in a predetermined time of a temperature at a plurality of places of the torque sensor, a difference in temperature from another place at a plurality of places of the torque sensor, a value of a change in a predetermined time of a difference in temperature from another place at a plurality of places of the torque sensor, or the like. The sensor temperature determination unit may be configured to perform a determination whether a temperature state of the torque sensor is an abnormal state or a determination whether a temperature state of the torque sensor is an appropriate temperature state by comparing, with a predetermined threshold value, the value based on an output value of the temperature detection unit included in the torque sensor.

Further, the sensor temperature determination unit may be configured to perform a determination whether a temperature state of the torque sensor is an abnormal state or a determination whether a temperature state of the torque sensor is an appropriate temperature state by comparing, with a predetermined threshold value, a value according to temperature compensation of torque data by the temperature compensation unit. The value according to temperature compensation of torque data by the temperature compensation unit is a value considered as a portion subjected to the temperature compensation when torque data are calculated by the temperature compensation. The value according to temperature compensation of torque data by the temperature compensation unit includes, for example, a difference in torque data before the temperature compensation and after the temperature compensation, a value of a coefficient by which a value of torque data during the temperature compensation is multiplied, and a value in which a coefficient by which a value detected by the displacement detector is multiplied in conversion into torque data by the temperature compensation is changed in accordance with a temperature of the temperature compensation, and the like.

The sensor temperature determination unit can perform a comparison between a value based on an output value of the temperature detection unit included in the torque sensor and a predetermined threshold value, and a comparison between a value according to temperature compensation of torque data by the temperature compensation unit and a predetermined threshold value. Then, the sensor temperature determination unit may be configured to perform a determination whether a temperature state of the torque sensor is an abnormal state or a determination whether a temperature state of the torque sensor is an appropriate temperature state by whether a predetermined number of determination conditions holds true.

The sensor temperature determination unit can perform a comparison between a value based on an output value of the temperature detection unit included in the torque sensor and a predetermined threshold value, and a comparison between a value according to temperature compensation of torque data by the temperature compensation unit and a predetermined threshold value. A numerical value when a condition holds true can be assigned in advance as a score to each condition of the comparison. Then, the sensor temperature determination unit may be configured to perform a determination whether a temperature state of the torque sensor is an abnormal state or a determination whether a temperature state of the torque sensor is an appropriate temperature state by a comparison between a total sum of scores assigned to conditions that hold true and a predetermined threshold value related to the score.

The sensor temperature determination unit may calculate, as a degree of excellence (degree of whether good or bad) of a temperature state of the torque sensor, a value obtained from a value based on an output value of the temperature detection unit included in the torque sensor and a value according to temperature compensation of torque data by the temperature compensation unit. Then, the sensor temperature determination unit may be configured to perform a determination whether the temperature state of the torque sensor is an abnormal state or a determination whether the temperature state of the torque sensor is an appropriate temperature state by a comparison between a numerical value of the degree of excellence of the temperature state of the torque sensor and the predetermined threshold value.

The sensor temperature determination unit may calculate a degree of excellence of the temperature state of the torque sensor, based on al least one of an output value of the temperature detection unit included in the torque sensor and a value according to temperature compensation of torque data by the temperature compensation unit. Then, the sensor temperature determination unit may be configured to perform a determination whether the temperature state of the torque sensor is an abnormal state and a determination whether the temperature state of the torque sensor is an appropriate temperature state by a comparison between the degree of excellence of the temperature state of the torque sensor and a predetermined threshold value.

Note that, when it is determined that a temperature state of the torque sensor is not an abnormal state and is not an appropriate temperature state, the operation command unit may change an operation command of the robot in such a way that at least one of a speed and acceleration is smaller than a predetermined value with respect to an operation command of the robot according to a calculated degree of excellence of the temperature state of the torque sensor. Alternatively, the operation command unit may change an operation command of the robot in such a way that at least one of a speed and acceleration is multiplied by a predetermined proportion and set smaller.

The sensor temperature determination unit may calculate, from an output value of the temperature detection unit included in the torque sensor and a value according to temperature compensation of torque data by the temperature compensation unit, a value of a change in a predetermined time of the value, a difference from a value in the torque sensor at another place, or the like, and obtain a degree of excellence of a temperature state of the torque sensor. The sensor temperature determination unit may be configured to perform a determination whether the temperature state of the torque sensor is an abnormal state or a determination whether the temperature state of the torque sensor is an appropriate temperature state by a comparison between the degree of excellence of the temperature state of the torque sensor and a predetermined threshold value.

The sensor temperature determination unit may calculate, as a degree of excellence of a temperature state of the torque sensor, a value obtained by substituting an output value of the temperature detection unit included in the torque sensor, a value of a change in a predetermined time of the output value of the temperature detection unit, and, as a value according to temperature compensation of torque data by the temperature compensation unit, a value in which the temperature compensation is performed on the torque data (a value added to or subtracted from the torque data) and a coefficient according to the temperature compensation for the torque data into a predetermined polynomial (evaluation function). The sensor temperature determination unit may be configured to perform a determination whether the temperature state of the torque sensor is an abnormal state or a determination whether the temperature state of the torque sensor is an appropriate temperature state by a comparison between the degree of excellence of the temperature state of the torque sensor and a predetermined threshold value.

The sensor temperature determination unit may determine a numerical value corresponding to a value based on an output value of the temperature detection unit included in the torque sensor from a predetermined numerical value assigned to each range in which the value based on the output value of the temperature detection unit is present. Alternatively, the sensor temperature determination unit may determine a numerical value corresponding to a value according to temperature compensation of torque data by the torque data temperature compensation unit from a predetermined numerical value assigned to each range in which the value according to the temperature compensation of the torque data is present. The sensor temperature determination unit may calculate a value obtained by adding the numerical values as a degree of excellence of a temperature state of the torque sensor. The sensor temperature determination unit may be configured to perform a determination whether the temperature state of the torque sensor is an abnormal state or a determination whether the temperature state of the torque sensor is an appropriate temperature state by a comparison between a numerical value of the degree of excellence of the temperature state of the torque sensor and a predetermined threshold value.

More specifically, the sensor temperature determination unit can determine a plurality of regions obtained by dividing a range in which a value based on an output value of the temperature detection unit is present. A predetermined numerical value can be assigned in advance to each of the regions. The sensor temperature determination unit determines a numerical value of a region corresponding to the value based on the output value of the temperature detection unit. Alternatively, the sensor temperature determination unit can determine a plurality of regions obtained by dividing a range in which a value according to temperature compensation of torque data is present. A predetermined numerical value can be assigned in advance to each of the regions. The sensor temperature determination unit determines a numerical value of a region corresponding to the value according to the temperature compensation of the torque data. The sensor temperature determination unit may calculate, as a degree of excellence of a temperature state of the torque sensor, a value obtained by adding the numerical value of the region corresponding to the value based on the output value of the temperature detection unit and the numerical value of the region corresponding to the value according to the temperature compensation of the torque data.

The sensor temperature determination unit may set, as a degree of excellence of a temperature state of the torque sensor, a value obtained by substituting a value based on an output value of the temperature detection unit included in the torque sensor and a value according to temperature compensation of torque data by the temperature compensation unit into a predetermined polynomial (evaluation function). The sensor temperature determination unit may be configured to perform a determination whether the temperature state of the torque sensor is an abnormal state or a determination whether the temperature state of the torque sensor is an appropriate temperature state by a comparison between a numerical value of the degree of excellence of the temperature state of the torque sensor and a predetermined threshold value.

For example, the sensor temperature determination unit may calculate, as a degree of excellence of a temperature state of the torque sensor, a value obtained from a coupling sum of a value obtained by multiplying a gap between a value based on an output value of the temperature detection unit included in the torque sensor and a predetermined threshold value by a predetermined coefficient, and a value obtained by multiplying a gap between a value according to temperature compensation of torque data by the temperature compensation unit and a predetermined threshold value by a predetermined coefficient.

The sensor temperature determination unit may calculate, as a degree of excellence of a temperature state of the torque sensor, a value obtained from a coupling sum of a value obtained by multiplying a gap between an output value of the temperature detection unit included in the torque sensor and a predetermined threshold value by a predetermined coefficient, a value obtained by multiplying a gap between a value of a change in a predetermined time of the output value of the temperature detection unit and a predetermined threshold value by a predetermined coefficient, and a value obtained by multiplying a gap between a value according to temperature compensation of torque data by the temperature compensation unit and a predetermined threshold value by a predetermined coefficient. As a value according to temperature compensation of torque data herein, a value in which the temperature compensation is performed on the torque data (a value added to or subtracted from the torque data before the compensation) or a coefficient according to the temperature compensation for the torque data can be adopted.

The sensor temperature determination unit can determine that an output value of the temperature detection unit included in the torque sensor is not within a predetermined threshold value, a value of a change in a predetermined time of the output value of the temperature detection unit is not within a predetermined threshold value, and a value according to temperature compensation of torque data by the temperature compensation unit is not within a predetermined threshold value. When at least one or more conditions of the determination conditions are satisfied, the sensor temperature determination unit may calculate, as a degree of excellence of a temperature state of the torque sensor, a value obtained by adding a predetermined numerical value assigned to each of the conditions for the condition being satisfied. As a value according to temperature compensation of torque data herein, a value in which the temperature compensation is performed on the torque data or a coefficient according to the temperature compensation for the torque data can be adopted.

The sensor temperature determination unit can perform a determination that an output value of the temperature detection unit included in the torque sensor is not within a predetermined threshold value, a value of a change in a predetermined time of the output value of the temperature detection unit is not within a predetermined threshold value, and a value according to temperature compensation of torque data by the temperature compensation unit is not within a predetermined threshold value. As a value according to temperature compensation of torque data, a value in which the temperature compensation is performed on the torque data or a coefficient according to the temperature compensation for the torque data can be adopted. When at least one or more conditions of the determination conditions are satisfied, the sensor temperature determination unit may calculate, as a degree of excellence of a temperature state of the torque sensor, a value obtained by adding a predetermined numerical value assigned to each range in which an output value of the temperature detection unit is present, a predetermined numerical value assigned to each range in which a value of a change in a predetermined time of the output value of the temperature detection unit is present, and a predetermined numerical value assigned to each range in which a value according to the temperature compensation of the torque data by the temperature compensation unit is present, When two or more temperature sensors are included in the temperature detection unit, the sensor temperature determination unit acquires, from the temperature detection unit, a value detected by the plurality of temperature sensors. Then, the sensor temperature determination unit may determine whether a temperature state of the torque sensor is an abnormal state or determine whether a temperature state of the torque sensor is an appropriate temperature state by a determination whether output values of the plurality of temperature sensors deviate from each other by equal to or more than a predetermined threshold value. For example, when the output values of the plurality of temperature sensors deviate from each other by equal to or more than the predetermined threshold value, the sensor temperature determination unit can determine that the torque sensor is in an abnormal state.

In the robot including the torque sensor that measures torque acting on the robot, the airtightness of the robot is often high for an improvement in dust resistance, an improvement in water resistance, or a measure against electric noise as a purpose of improving reliability. Further, the torque sensor is often closely attached to a mechanism unit inside the robot in such a way as to increase measurement accuracy of torque and installed in such a way as to accurately transmit torque. The torque sensor may be disposed in such a way as to easily transmit heat generated in the actuator. Further, in a work environment of the robot, the robot is susceptible to a change of a temperature of a surrounding environment such as a temperature, a temperature of a surrounding device, a temperature of the tool, a temperature of the hand, or a temperature of an object to be transported. Further, a load on the joint axis of the robot may be great due to dependence on an operation of the robot, and a weight and a position of the center of gravity of an object to be transported by the robot. Further, the temperature change described above or a load on the joint axis may greatly change in a short time.

In such a case, a change in temperature of the torque sensor included in the robot is great, or a temperature changes across a wide range. Depending on a temperature state of the torque sensor, it may be difficult to appropriately perform compensation by a temperature of torque data, and a value of the torque data may not be appropriate. Further, although not a situation determined to be abnormal, detection accuracy of the torque sensor may decrease. The robot system according to the present embodiment can control a temperature state of the torque sensor to an appropriate state. Deterioration of accuracy of torque data can be suppressed by accurately performing temperature compensation of the torque data.

Further, even when the torque sensor is not abnormal, a temperature of the joint portion provided with the torque sensor may be preferably reduced, or detection accuracy of torque data may need to be set as good as possible. The robot system according to the present embodiment determines a condition for a determination whether a temperature state of the torque sensor is an appropriate temperature state in such a way that the temperature state of the torque sensor is determined not to be the appropriate temperature state. The robot system can suppress an increase in temperature of the joint portion, and set a temperature state of the torque sensor to an appropriate state.

Further, an operator may directly come into contact with the robot for an operation by direct teaching, an operation of stopping a motion of the robot in cooperation work, and changing a motion or setting, or the like. In this case, since a temperature near the joint axis of the robot or a temperature state of the torque sensor included in the joint axis of the robot is not recognized, the robot may have an unexpected temperature, or a deterioration situation of accuracy due to a temperature fluctuation of the torque sensor included in the robot may not be recognized. For example, when the robot is moved for a long time at a high speed in an operation mode in which contact with a person is not assumed, and then used in an operation mode in which contact with a person is assumed, the joint portion and the torque sensor of the robot may have a high temperature. Further, even in an operation mode of detecting contact with a person, when a predetermined operation having a great load on the joint portion continues for a long time, or when driving is continuously performed at a high speed for a long time, the joint portion or the torque sensor of the robot may have a high temperature. In such a case, even when there is no abnormality in the torque sensor and the actuator of the robot, it may be hot for a person to contact, detection accuracy of the temperature sensor may deteriorate, and detection accuracy of the torque sensor may decrease.

In this way, even when a temperature of the joint portion of the robot is a temperature that is not a problem for the actuator such as the motor, a temperature state may not be appropriate as a temperature state of the torque sensor of the robot working in cooperation with an operator. Further, even when detection accuracy of the torque sensor is not deteriorating and detection accuracy of the torque sensor has no problem, it may be too hot for an operator to contact the robot, or detection accuracy of the torque sensor may be set better than that in a normal state. The robot system according to the present embodiment determines a condition for a determination whether a temperature state of the torque sensor is an appropriate temperature state in such a way that the temperature state of the torque sensor is determined not to be the appropriate temperature state. The robot system can detect that a temperature state of the torque sensor is not an appropriate temperature state. In a case where a temperature state of the torque sensor is not an appropriate temperature state, the robot system can set an appropriate temperature when an operator comes into contact with the robot by changing an operation of the robot without using a special device or mechanism or an additional device or mechanism. Further, the robot system can set detection accuracy of torque data of the torque sensor in an excellent state when an operator comes into contact with the robot. Furthermore, the robot system according to the present embodiment can reduce a load on the robot as necessary.

Note that the sensor temperature determination unit can be disposed in any device included in the robot system. In the present embodiment, the sensor temperature determination unit 34 is disposed in the controller 4 separated from the robot 1, but may be disposed inside each torque sensor. Further, the sensor temperature determination unit may be disposed in a controller disposed in the robot, a controller integrally formed with the robot, or the robot driving unit.

(Operation Command Unit)

The operation command unit 43 changes an operation command for driving the robot 1 according to a situation, and outputs the operation command. The robot driving unit is driven based on the operation command of the robot 1 being output from the operation command unit 43. A rotational position in the joint axis of the robot 1 is changed, and a position and a posture of the robot 1 change.

The operation command unit 43 according to the present embodiment is disposed in the controller 4 separated from the robot 1, but the present invention is not limited to this form. The operation command unit 43 may be included in any device as long as the device is a device included in the robot system. For example, the operation command unit may be disposed in a controller disposed in the robot, a controller integrally formed with the robot, or the robot driving unit.

Note that the operation command unit may be configured to perform a predetermined operation, based on data stored in the storage unit, when an operation command for driving the robot by the predetermined operation is output. Further, an operation command may be generated or changed based on an output of various sensors. Further, a device including the operation command unit may be connected to an external network. The operation command unit may generate an operation command of the robot, based on data or an operation program related to an operation such as a position and a speed of the robot being transmitted through the external network.

When there is the torque sensor 20 determined that a temperature state of the torque sensor is an abnormal state by the sensor temperature determination unit 34, the operation command unit 43 changes and outputs an operation command in such a way as to stop the robot 1. On the other hand, when there is no torque sensor 20 determined that a temperature state of the torque sensor is an abnormal state, the operation command unit 43 changes a predetermined operation command of the robot in such a way that at least one of a speed and acceleration of the robot driving motor 19 of the joint axis provided with the torque sensor 20 determined not to be in an appropriate temperature state by the sensor temperature determination unit 34 is equal to or less than a predetermined value. Alternatively, the operation command unit 43 changes a predetermined operation command of the robot in such a way that at least one of a speed and acceleration of the robot driving motor 19 of the joint axis provided with the torque sensor 20 determined not to be in an appropriate temperature state by the sensor temperature determination unit 34 is multiplied by a predetermined proportion and set smaller.

In a case where the sensor temperature determination unit obtains a degree of excellence of a temperature state of the torque sensor, when there is the torque sensor determined that the temperature state of the torque sensor is an abnormal state by the sensor temperature determination unit, the operation command unit changes and outputs an operation command in such a way as to stop the robot. On the other hand, when there is no torque sensor 20 determined that the temperature state of the torque sensor is an abnormal state, the operation command unit changes a predetermined operation command of the robot 1 in such a way that at least one of a speed and acceleration of the robot driving motor 19 of the joint axis provided with the torque sensor determined not to be in an appropriate temperature state by the sensor temperature determination unit is equal to or less than a predetermined value according to the degree of excellence of the temperature state of the torque sensor. Alternatively, the operation command unit 43 may chance a predetermined operation command of the robot in such a way that at least one of a speed and acceleration of the robot driving motor 19 of the joint axis provided with the torque sensor determined not to be in an appropriate temperature state by the sensor temperature determination unit 34 is multiplied by a predetermined proportion according to the degree of excellence of the temperature state of the torque sensor and set smaller.

When there is no torque sensor determined that a temperature state of the torque sensor is an abnormal state, the operation command unit 43 changes a predetermined operation command of the robot 1 in such a way that a speed and acceleration of the robot driving motor 19 of the joint axis provided with the torque sensor 20 determined not to he in an appropriate temperature state by the sensor temperature determination unit 34 are smaller, At this time, the operation command unit may change an operation command of the robot driving motor in all the joint axes of the robot in such a way that a relative positional relationship of all the joint axes of the robot when the robot is driven based on a predetermined operation is a deviation within a predetermined threshold value.

When there is no torque sensor determined that a temperature state of the torque sensor is an abnormal state and there is the torque sensor determined that a temperature state of the torque sensor is not an appropriate temperature state, the operation command unit may change an operation command of the robot driving motor of the plurality of joint saxes of the robot in such a way that at least one of a speed and acceleration of all the joint axes of the robot when the robot is driven based on a predetermined operation is multiplied by a predetermined proportion and set smaller. When at least one of the speed and the acceleration is multiplied by the predetermined proportion and set smaller, the predetermined proportion may be changed according to a numerical value of a degree of excellence of a temperature state of the torque sensor described above. For example, the operation command unit may change the predetermined proportion in such a way that the speed and the acceleration are smaller as the degree of excellence of the temperature state of the torque sensor is lower.

When at least one of a speed and acceleration of the robot driving motor of the joint axis provided with the torque sensor determined not to be in an appropriate temperature state by the sensor temperature determination unit is set smaller with respect to a predetermined operation command of the robot, there may be the plurality of joint axes provided with the torque sensor determined not to be in an appropriate temperature state by the sensor temperature determination unit. When a speed of the robot driving motor of the joint axis provided with the torque sensor determined not to be in an appropriate temperature state by the sensor temperature determination unit is set smaller, a smallest value is used as a ratio that reduces the speed in the joint axis provided with the torque sensor determined not to be in the appropriate temperature state by the sensor temperature determination unit. An operation command of the robot may be changed for all the joint axes of the robot in such a way that the speed of the robot driving motor is reduced at a smallest ratio with respect to a predetermined operation of the robot. Alternatively, when acceleration in the joint axis provided with the torque sensor determined not to be in an appropriate temperature state by the sensor temperature determination unit is set smaller, a smallest value is used as a ratio that reduces the acceleration in the joint axis provided with the torque sensor determined not to be in the appropriate temperature state by the sensor temperature determination unit. An operation command of the robot may be changed for all the joint axes of the robot in such a way that the acceleration of the robot driving motor is reduced at a smallest ratio with respect to a predetermined operation of the robot.

The controller 4 may include an operation command changing unit that changes an operation of the robot 1. For example, the operation command unit 43 or the operation control unit 31 can include the operation command changing unit. The operation command changing unit corresponds to a processor that drives according to an operation program. The processor performs control determined by the operation program, and thus functions as the operation command changing unit. The operation command changing unit can change an operation of the robot, based on a determination result of the sensor temperature determination unit. Further, when the operation command changing unit changes an operation of the robot and the sensor temperature determination unit then determines that a temperature state of the torque sensor is not appropriate, it is preferable that the operation command changing unit further reduces at least one of a speed and accelerations of the robot and stops the robot.

The operation command changing unit can be configured to change an operation command of the robot being output from the operation command unit when the operation command changing unit calculates the operation command of the robot inside the operation command unit. The operation command changing unit may not only adjust a speed and acceleration of a predetermined operation command, but also generate an operation command in such a way as to change a position, a trajectory, a speed, acceleration, and the like in order to perform an operation according to a situation.

The operation command changing unit may generate or change an operation command of the robot according to a value of torque data. Further, the operation command changing unit may be configured to change an operation command being output from the operation command unit.

(Example of Control for Changing Operation Command)

Figure 4:
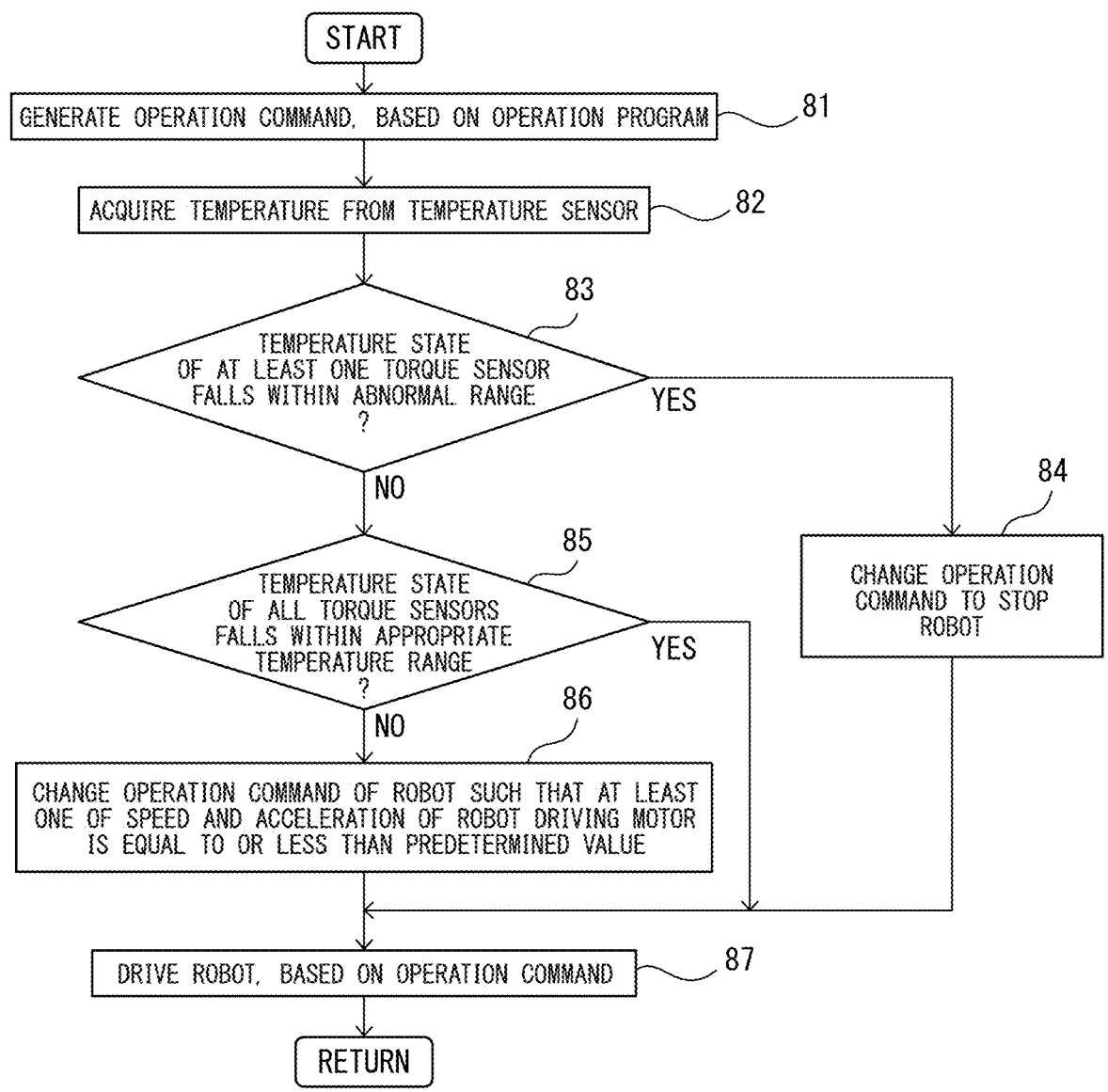
FIG. 4 is a flowchart of control for changing an operation of a robot of the first robot system.

FIG. 4 illustrates a flowchart of control for changing an operation command of the first robot system according to the present embodiment. The control illustrated in FIG. 4 can be repeatedly performed at predetermined time intervals. With reference to FIGS. 3 and 4, in step 81, the operation command unit 43 generates an operation command of the robot 1, based on the operation program 41. Meanwhile, in step 82, the sensor temperature determination unit 34 acquires a temperature from the temperature sensor 22 of the torque sensor 20, and determines a temperature state of the torque sensor.

In step 83, when a temperature state of at least one torque sensor 20 is an abnormal state, the sensor temperature determination unit 34 transmits the information to the operation command unit 43. The control shifts to step 84. In step 84, the operation command unit 43 changes an operation command of the robot 1 in such a way as to stop the robot 1. In step 87, the operation command unit 43 stops the robot 1.

In step 83, when a temperature state of all the torque sensors 20 falls outside a range of the abnormal state, the control shifts to step 85. In step 85, the sensor temperature determination unit 34 determines whether the temperature state of all the torque sensors 20 is an appropriate temperature state. When the temperature state of all the torque sensors falls within a range of the appropriate temperature state, the operation command unit 43 does not change the operation command generated in step 81. The control shifts to step 87, the operation command unit 43 drives the robot 1 by the operation command generated in step 81.

In step 85, when a temperature state of at least one torque sensor 20 is not the appropriate temperature state, the control shifts to step 86. The sensor temperature determination unit 34 transmits the information to the operation command unit 43. For example, when a temperature state of one or more torque sensors 20 falls within a range between the appropriate temperature state and the abnormal state, the control shifts to step 86.

In step 86, the operation command unit 43 performs control for reducing at least one of a speed and acceleration of the robot driving motor 19 that drives the robot 1. The operation command unit 43 changes an operation of the robot driving motor 19 of the joint axis in which the torque sensor 20 determined by the sensor temperature determination unit 34 that a temperature state falls outside a range of the appropriate temperature state is disposed. The operation command unit 43 changes the operation command of the robot 1 in such a way that at least one of the speed and the acceleration of the robot driving motor 19 is equal to or less than a predetermined value. Next, in step 87, the operation command unit 43 drives the robot 1 by the operation command changed in step 86.

In this way, when a temperature state of at least one torque sensor does not fall within a range of an abnormal state and further falls outside a range of an appropriate temperature state, the control for reducing at least one of a speed and acceleration of the robot driving motor of the joint portion in which the torque sensor is disposed can be performed. By performing the control, the robot 1 can be driven in such a way that a temperature of the torque sensor decreases and the temperature state of the torque sensor approaches the range of the appropriate temperature state.

In the present embodiment, an operation mode of changing an operation of the robot 1 in such a way that a temperature state of the torque sensor approaches the range of the appropriate temperature state is referred to as an appropriate temperature mode. In the appropriate temperature mode, any control for causing a temperature of the torque sensor disposed in the robot 1 to approach the range of the appropriate temperature state can be performed.

Figure 5:
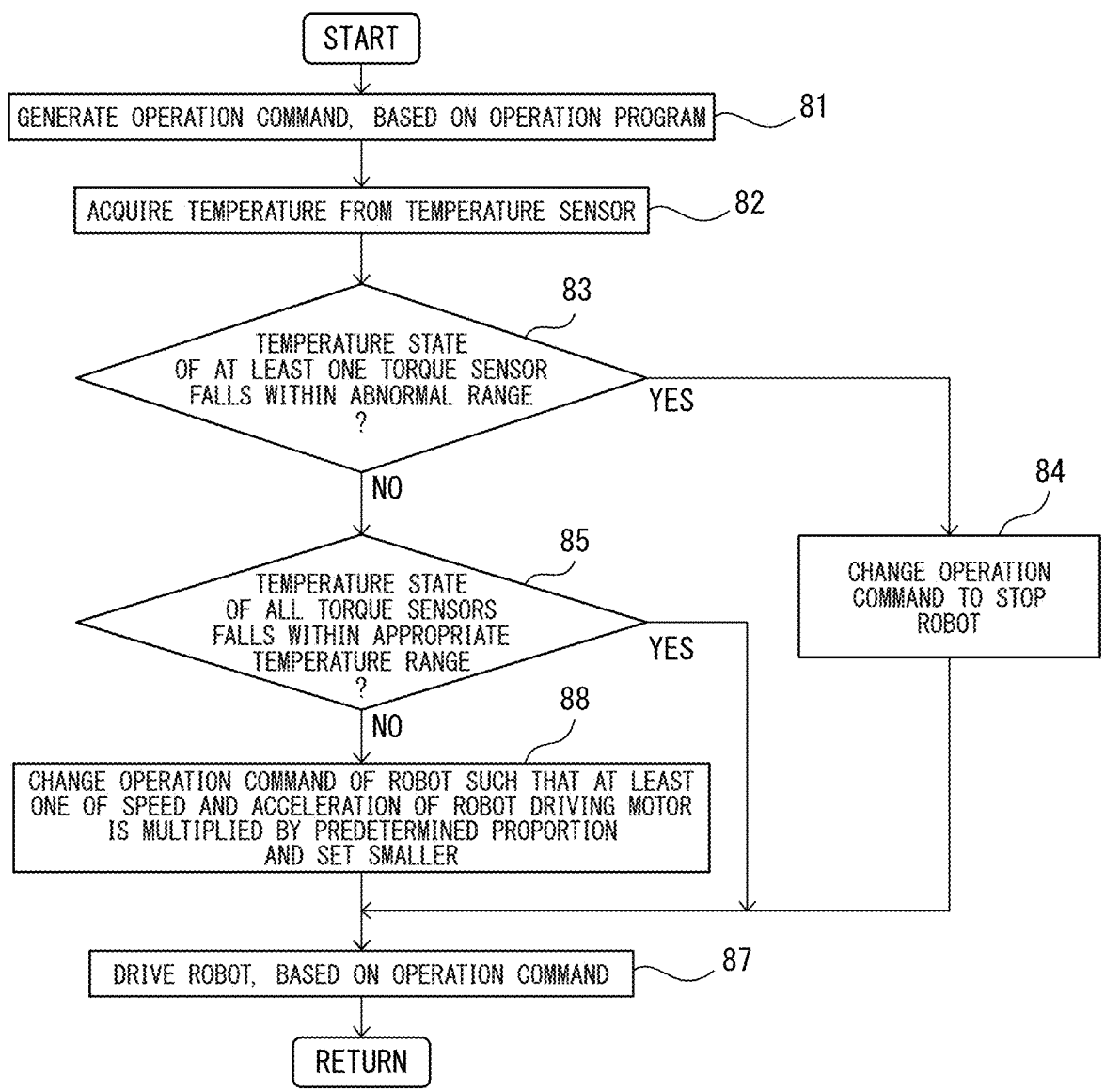
FIG. 5 is a flowchart of other control for changing an operation of the robot of the first robot system.

FIG. 5 illustrates a flowchart of other control for changing an operation command of the first robot system according to the present embodiment. The control illustrated in FIG. 5 can be repeatedly performed at predetermined time intervals. The process from step 81 to step 85 is similar to that in the control illustrated in FIG. 4. In the other control illustrated in FIG. 5, step 88 is different from the control illustrated in FIG. 4. In step 85, when a temperature state of at least one torque sensor 20 deviates from a range of the appropriate temperature state, the control shifts to step 88.

In step 88, the operation command unit 43 changes an operation of the robot driving motor 19 of the joint axis in which the torque sensor determined by the sensor temperature determination unit 34 that a temperature state falls outside a range of the appropriate temperature state is disposed. The operation command unit 43 changes the operation command of the robot in such a way that at least one of the speed and the acceleration of the robot driving motor 19 is multiplied by a predetermined proportion and set smaller. In other words, the operation command unit 43 generates the operation command of the robot 1 in such a way as to set the speed or the acceleration multiplied by a proportion less than 1. Next, in step 87, the operation command unit 43 drives the robot 1 by the operation command changed in step 88.

In this way, when a temperature state of the torque sensor is neither an abnormal state nor an appropriate temperature state, an operation of the robot 1 can be changed in such a way that the temperature state of the torque sensor approaches the appropriate temperature state while driving of the robot 1 continues.

(Effect of First Robot System)

In the robot system, even in a temperature state that is no problem for the driving unit including the actuator of the robot during a period for driving the robot, a temperature state of the torque sensor included in the joint axis of the robot may deteriorate. In the robot system according to the prior art, an error of temperature data may increase and an error of torque data may increase caused by a decrease in detection accuracy of the temperature sensor included in the torque sensor and deterioration of measurement accuracy of torque data due to deterioration of a temperature state of the torque sensor. As a result, predetermined magnitude of torque or force acting on the robot may not be able to be accurately detected, the robot may stop due to false detection in detection of contact with surroundings, an unintended operation may be performed in direct teaching in which force directly acts on the robot and the robot is moved.

In contrast, in the robot system according to the present embodiment, deterioration of a temperature state of the torque sensor disposed in the joint axis is suppressed, and thus a decrease in detection accuracy of the temperature sensor of the torque sensor can be suppressed and deterioration of measurement accuracy of torque data can be suppressed. False detection of torque applied to a constituent member of the robot can be suppressed, and a false operation of the robot can be suppressed.

Further, when the torque sensor is not in an appropriate temperature state, or a temperature state of the joint portion of the robot is not in an appropriate temperature state, the temperature state of the torque sensor included in the joint axis of the robot and the temperature state of the joint portion of the robot can be improved without using a special device, structure, or mechanism for cooling the torque sensor or the robot.

The robot system according to the present embodiment stops the robot when a temperature state of the torque sensor included in the joint axis of the robot is an abnormal state. By the control, the robot can be prevented from being in contact with an operator or a surrounding object with excessive force, and a safe state for using the robot can be secured.

Furthermore, even when a temperature state of the torque sensor is worse than an appropriate temperature state, the robot may be continuously moved in a state where an abnormal state is not reached. For example, when force having a predetermined value or more is detected based on torque acting on the torque sensor or work based on detected torque is performed in a situation where the robot is in contact with an operator, a surrounding device, or the like, a detection error of the torque sensor may be set within an allowable range in which an abnormal state is not reached by contrivance of providing a margin and the like. In this case, the robot can be continuously driven in safer and more user-friendly state by setting measurement accuracy of the torque sensor in an excellent state and setting a temperature of the joint portion of the robot to an appropriate temperature state.

Further, a temperature of the torque sensor disposed in the joint portion of the robot may increase or the robot may be susceptible to a rapid temperature change, not only due to an operation of the driving unit including the actuator of the robot but also due to a temperature in a work environment of the robot and a temperature of a surrounding environment of a surrounding device, the tool, the hand, an object to be transported, or the like. A temperature of a device other than a temperature of the actuator including the robot driving motor is reflected in a temperature state of the torque sensor. A temperature state of the torque sensor also becomes worse when a temperature of a portion other than the actuator is high. The robot system according to the present embodiment detects a case where a temperature state of the torque sensor instead of a temperature of the actuator is abnormal, or a case where a temperature state of the torque sensor is not abnormal but is not an appropriate temperature. When the temperature state of the torque sensor is abnormal, the robot is stopped. When the temperature state of the torque sensor is not an appropriate temperature, a speed at which the robot is driven is reduced, or an unreasonable movement is prevented. Thus, safety can be increased while the robot continuously operates.

Particularly, in the cooperation robot in which contact with a person is assumed, a temperature state around the robot can also be considered by using a temperature sensor of the torque sensor included in the joint portion of the robot. In other words, a temperature of the joint portion can be more appropriately detected when a temperature of the robot is detected. Further, when a temperature of the joint portion of the robot is high and is not an appropriate temperature in the cooperation robot, the temperature of the joint portion of the robot can be set as an appropriate temperature state by changing an operation of the robot. Further, a temperature state of the joint portion of the robot including a surrounding environment and the like can be set to an excellent state by changing an operation of the robot according to a temperature state of the torque sensor instead of using a temperature of the driving unit.

Further, even when a temperature state of the plurality of torque sensors included in the plurality of joint portions is monitored, and a temperature of each of the joint portions falls within an allowable range, there may be variations in the temperature state of each of the torque sensors disposed in the joint portion. When a difference in the temperature state is great and the temperature states of the plurality of torque sensors are different over a predetermined range, an operation of the robot can be changed. An operation of the robot can be changed in such a way that the temperature states of the plurality of joint portions of the robot approach. An operator may feel uncomfortable when the operator touches the cooperation robot in a case where temperatures of the plurality of joint portions are different from each other. Since the robot system according to the present embodiment can bring temperatures of the plurality of joint portions closer, discomfort of an operation can be reduced, and ease of use as the cooperation robot can be improved.

(Second Robot System)

Figure 6:
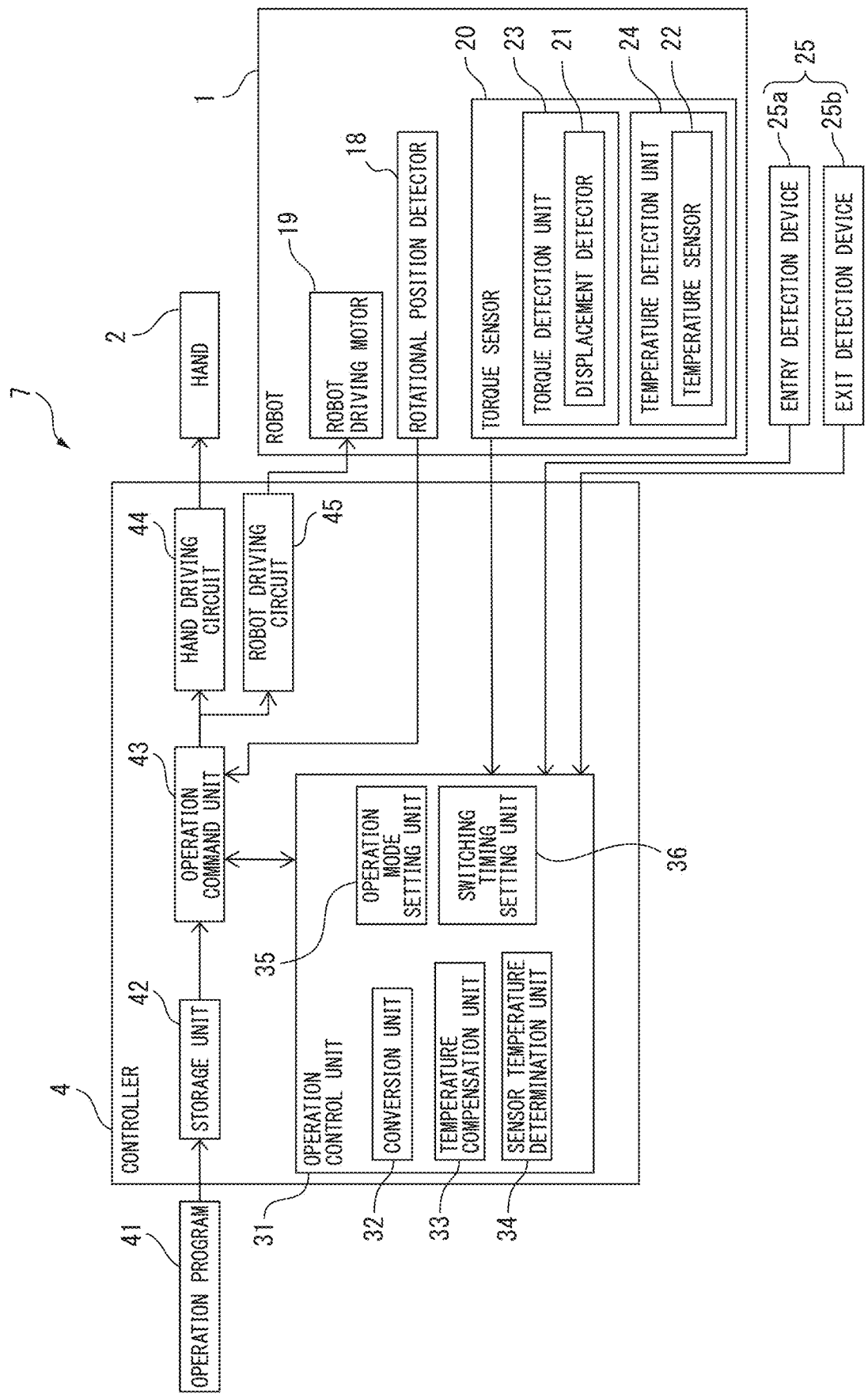
FIG. 6 is a block diagram of a second robot system according to the embodiment.

FIG. 6 illustrates a block diagram of a second robot system according to the present embodiment. A second robot system 7 is different from the first robot system 6 in a configuration of an operation control unit 31 of a controller 4. Further, the second robot system 7 includes an operator detection device 25 that detects an operation of an operator. The other configuration, action, and effects of the second robot system 7 are similar to those of the first robot system 6 (see FIG. 3).

The operation control unit 31 of the second robot system 7 includes, in addition to a conversion unit 32, a temperature compensation unit 33, and a sensor temperature determination unit 34, an operation mode setting unit 35 that sets effectiveness or ineffectiveness of an appropriate temperature mode, and a switching timing setting unit 36 that sets a timing for switching between a normal operation mode of driving a robot 1 by an operation pattern determined in an operation program 41, and the appropriate temperature mode. Each unit of the operation mode setting unit 35 and the switching timing setting unit 36 corresponds to a processor that drives according to the operation program 41. The processor reads the operation program 41 and performs control determined by the operation program 41, and thus functions as each unit.

(Operation Mode Setting Unit)

The operation mode setting unit 35 sets, as a mode of operating the robot 1, the appropriate temperature mode to an effective state or an ineffective state. The operation mode setting unit 35 sets, as a mode of operating the robot, the appropriate temperature mode to an effective state or an ineffective state at a predetermined timing based on setting of the switching timing setting unit 36. Note that, as the mode of operating the robot, the appropriate temperature mode is preferably set to an effective state as necessary. However, the operation mode setting unit 35 may always set the appropriate temperature mode to an effective state as the mode of operating the robot 1.

In a case where the appropriate temperature mode is effective as the mode of operating the robot, when the sensor temperature determination unit determines that a temperature state of a torque sensor is not an appropriate temperature state, the operation command unit changes an operation of the robot in such a way that at least one of a speed and acceleration of a joint axis provided with the torque sensor is limited and set smaller, and a load on a joint portion is reduced. An operation command unit 43 performs control in such a way that a temperature state of the torque sensor is an appropriate temperature state or the temperature state of the torque sensor approaches the appropriate temperature state.

The operation mode setting unit 35 may be included in any device as long as the device is a device included in the robot system. For example, the operation mode setting remit may be disposed in a controller separated from the robot, a controller disposed in the robot, a controller integrally formed with the robot, or a robot driving unit. Alternatively, a device including the operation mode setting unit, the switching timing setting unit, and the operation command unit may be connected to an external network that can communicate with the robot.

(Switching Timing Setting Unit)

The switching timing setting unit 36 sets a timing for switching the appropriate temperature mode to an effective state or an ineffective state. As the timing for switching the appropriate temperature mode to the effective state or the ineffective state, a point in time, such as a predetermined time, a time of a predetermined state, a time at which a predetermined condition holds true, or a time at which a predetermined condition fails, a condition, or the like can be specified.

The switching timing setting unit can adopt a time after the robot performs a predetermined operation, a time before the robot performs a predetermined operation, or a predetermined time as the timing for switching the appropriate temperature mode to an effective state or an ineffective state. Alternatively, the switching timing setting unit can adopt, as the switching timing, a time before a predetermined time from when the robot starts a predetermined operation or a time after a predetermined time. Alternatively, the switching timing setting unit can adopt, as the switching timing, a time after a predetermined time from when the robot ends a predetermined operation or a time before a predetermined time. Alternatively, the switching timing setting unit may be configured to adopt, as the switching timing, a time at which a predetermined signal is input or a time at which a predetermined signal is disconnected.

The switching timing setting unit can set the appropriate temperature mode to an effective state before a situation where the robot is more likely to be in contact with an operator, a surrounding device, or the like. Particularly, the appropriate temperature mode can be set effective in advance in order not to waste time as much as possible. Further, the switching timing setting unit can drive the robot by setting the appropriate temperature mode to the effective state only in a necessary situation.

As one example of a method for setting a switching timing, a statement that sets the appropriate temperature mode effective can be put after a statement that performs a predetermined operation in an operation program for driving the robot. When setting of a predetermined time is needed, a statement that sets a time before or after an operation can be put. Alternatively, an explicit statement of execution or an explicit statement of setting may be inserted in such a way that setting of time is allowed as an attribute of a statement that sets the appropriate temperature mode effective, and the like.

Further, a condition for setting the appropriate temperature mode effective or ineffective at which timing and the like may be able to be set as a property of a statement that performs a predetermined operation. For example, as a property of a statement of an operation program, a state of an operation of the robot in which the appropriate temperature mode is set effective or ineffective, a time before or after a predetermined operation, a condition for performing the appropriate temperature mode in a predetermined operation, a case where a predetermined signal is input or disconnected, a time at which setting is switched, or the like may be able to be set.

Further, a timing such as a timing after the robot performs a predetermined operation, a timing before the robot performs a predetermined operation, a predetermined time, a timing before or after a predetermined time from when the robot starts a predetermined operation, a timing after or before a predetermined time from when the robot ends a predetermined operation, or a timing at which a predetermined signal is input or disconnected may be able to be set from a controller included in the robot, an input device connected to the robot, or a device connected to the robot through a communication network. In this case, for example, an operator can confirm work being currently performed by the robot, immediately set the appropriate temperature mode effective, set the appropriate temperature mode effective at a predetermined timing, and set the appropriate temperature mode effective at any timing by the operator, by using a communication apparatus connected to the robot through a network. Further, the operator can set the mode of driving the robot to a state where the appropriate temperature mode is effective before the operator performs work in cooperation with the robot, and set a temperature state of the torque sensor to an appropriate temperature state when the work is actually performed.

The switching timing setting unit may switch the appropriate temperature mode to an effective state or an ineffective state at a predetermined time. By the control, the appropriate temperature mode of the robot can be set to the effective state or the ineffective state according to a time of a process of performing work by an operator in cooperation with the robot. Note that, when the operator ends the work with the robot, the appropriate temperature mode of the robot may be set to the ineffective state by inputting a signal or the like.

With reference to FIG. 6, the second robot system 7 includes the operator detection device 25 that detects whether an operator is present in a monitoring region where the robot 1 is disposed. In the second robot system 7, when the operator is present in the region where the robot 1 is disposed, an operation mode of the robot 1 can be switched from a normal operation mode to an appropriate temperature mode. The operator detection device 25 according to the present embodiment includes an entry detection device 25a that detects entry of the operator to the monitoring region, and an exit detection device 25b that detects exit of the operator from the monitoring region.

The entry detection device 25a detects that the operator is about to enter or has entered the predetermined region where the robot 1 is driven. The switching timing setting unit 36 may set the appropriate temperature mode to an effective state at a timing at which the entry detection device 25a detects that the operator is about to enter or has entered the predetermined region where the robot is driven.

The exit detection device 25b detects that the operator is about to exit or has exited from the predetermined region where the robot 1 is driven. The switching timing setting unit 36 may set the appropriate temperature mode to an ineffective state at a timing at which the exit detection device 25b detects that the operator is about to exit or has exited from the predetermined region where the robot 1 is driven.

A device of each of the entry detection device 25a and the exit detection device 25b can be formed of any measurement device such as a three-dimensional measuring instrument including light curtains, a laser scanner, a time-of-flight (TOF) camera, a camera that acquires a two-dimensional video, or a plurality of cameras. The entry detection device 25a and the exit detection device 25b may be any device as long as the device can detect or estimate that the operator has entered or is about to enter the predetermined monitoring region, or the operator has exited or is about to exit from the monitoring region. Note that a method for detecting that the operator is about to enter the monitoring region or is about to exit from the monitoring region may be any detection method. For example, a detection method for predicting and detecting an operation of an operator by measuring a movement direction of the operator, measuring passage through one or a plurality of points, measuring a distance between the operator and a predetermined point, and the like can be adopted. A method for detecting that the operator is about to enter the monitoring region or is about to exit from the monitoring region may be any method for detecting whether the operator is present in the monitoring region. Further, the entry detection device 25a and the exit detection device 25b may be achieved by a single device.

Further, the entry detection device and the exit detection device may be configured to be notified, from a controller in a different process or a device that manages a process, that the operator is about to enter, has entered, is about to exit from, or has exited from the predetermined region of the robot system. With this configuration, it may be detected or estimated that the operator has entered or is about to enter the predetermined monitoring region, or the operator has exited or is about to exit from the monitoring region.

As the region monitored by the entry detection device 25a and the exit detection device 25b, the entire region where the robot can drive, a part of a region where the robot can drive, a region predetermined by the operator, or the like can be adopted. By setting, as the region to be monitored, a part of region where the robot can drive such as a region where the operator and the robot are more likely to be in contact with each other, an operation mode of the robot can be set to the appropriate temperature mode under a limited situation.

Further, when the monitoring region is a region predetermined by the operator, the predetermined region can be set outside a region where the robot can drive. When the operator passes through the predetermined region, the appropriate temperature mode can be set effective before the operator enters the region where the robot can drive. Alternatively, the appropriate temperature mode can be set ineffective after the operator reliably leaves the region where the robot can drive.

The switching timing setting unit may be configured to be able to set, as a timing for switching the appropriate temperature mode to an effective state or an ineffective state, a timing for switching the appropriate temperature mode to the effective state or the ineffective state in such a way that a temperature state of the torque sensor is an appropriate temperature state after the robot performs a predetermined operation, before the robot performs a predetermined operation, or at a point in time of a predetermined time. In this case, the switching timing setting unit may be configured to set the timing for switching the appropriate temperature mode to the effective state or the ineffective state, based on a relationship between an operation in the joint axis provided with the torque sensor during an operation of the robot and a temperature state of the torque sensor.

The switching timing setting unit can monitor and record a value of a rotational position, a speed, and acceleration of a robot driving motor in each joint axis of the robot when the robot operates or a predetermined operation is performed in a predetermined time such as a pause. Furthermore, the switching timing setting unit can monitor and record, together with the value, a value related to a temperature state of the torque sensor such as an output value of a temperature detection unit included in the torque sensor and a value based on a value according to temperature compensation of torque data by the temperature compensation unit, and a value of a change in terms of time.

The switching timing setting unit can have a data table, based on data acquired from a current point in time to before a predetermined time, data acquired by performing a predetermined operation, or data acquired in the past. The switching timing setting unit may be configured to obtain a parameter of a relational expression of a speed and acceleration of the robot driving motor in each joint axis and a temperature state of the torque sensor, based on the acquired data.

Then, the switching timing setting unit can estimate, based on the relational expression, a change in a temperature state of the torque sensor when at least one of the speed and the acceleration of the robot driving motor in each joint axis of the robot is reduced. The switching timing setting unit can calculate time estimated to be required for the robot to perform a predetermined operation, based on operation information such as the operation program of the robot, a set or specified operation, a position, a speed, and acceleration. The switching timing setting unit may be configured to switch the appropriate temperature mode to an effective state or an ineffective state in such a way that a temperature state of the torque sensor is an appropriate temperature state after the robot performs a predetermined operation, before the robot performs a predetermined operation, or at a point in time of a predetermined time.

For example, the switching timing setting unit can set a temperature state of the torque sensor to an appropriate temperature state by setting, in advance, the operation mode of the robot to a state where the appropriate temperature mode is effective before a point in time at which the operator performs work in cooperation with the robot.

The switching timing setting unit may be included in any device as long as the device is a device included in the robot system. For example, the switching timing setting unit can be disposed in a device included in the robot system, such as a controller separated from the robot, a controller disposed in the robot, a controller integrally formed with the robot, or constituting the robot driving unit.

(Effect of Second Robot System)

The second robot system 7 according to the present embodiment can set a timing such as a timing or a condition for changing an operation of the robot in such a way that a temperature state of a torque sensor 20 is an appropriate temperature state. Normally, the robot is driven without changing an operation of the robot unless a temperature state of the torque sensor is an abnormal state. Then, particularly, a temperature of the joint portion of the robot can be efficiently set in an appropriate temperature state in advance before a situation where the robot is more likely to be in contact with an operator, a surrounding device, or the like. Further, measurement accuracy of the torque sensor can be set in an excellent state. Furthermore, a temperature of the joint portion of the robot can be set in an appropriate temperature state in advance only in a necessary situation.

By the control, when the robot comes into contact with an operator or a surrounding device, a temperature state of the torque sensor can be made better. An appropriate temperature state in which a temperature of the joint portion of the robot is not hot for an operator, and the like can be set. When a temperature of the joint portion of the robot is inappropriately changing due to a surrounding environment, an operation of the robot can be changed in such a way that the robot can safely drive. Particularly, a change in an operation of the robot can be limited to a necessary time.

In a situation where the robot is less likely to be in contact with an operator, a surrounding device, or the like, the robot can be moved by a normal operation. Thus, a work time of the robot system can be shortened, the robot system can perform a lot of work, and the robot system can continuously operate even in a situation with a load on the joint portion of the robot.

Further, for the joint portion in which a temperature state of the torque sensor is not appropriate during an operation of the robot, a load on the driving unit is expected to be relatively great. When a need to reduce a load on the joint portion of the robot is high, a load on the joint portion due to an operation causing a great load can be reduced. By the control, occurrence of a failure in the robot can be avoided, and a time interval until occurrence of a failure can be extended.

(Third Robot System)

Figure 7:
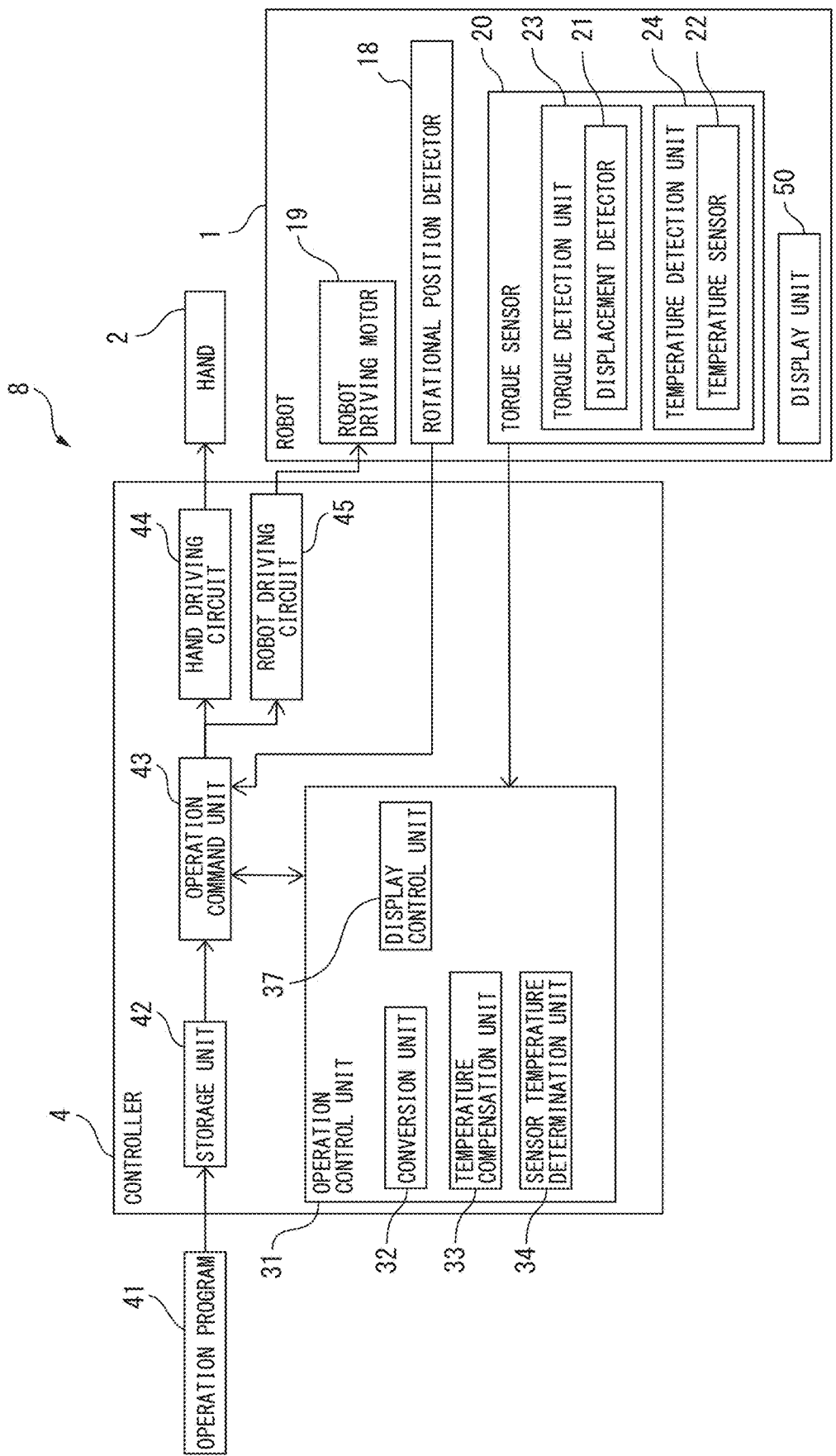
FIG. 7 is a block diagram of a third robot system according to the embodiment.

FIG. 7 illustrates a block diagram of a third robot system according to the present embodiment. A third robot system 8 is different from the first robot system 6 in a configuration in which a robot 1 includes a display unit and a controller 4 includes a display control unit. The other configuration, action, and effects of the third robot system 8 are similar to those of the first robot system 6 (see FIG. 3).

The robot 1 in the third robot system S includes a display unit 50 that displays predetermined information. As described below, the display unit 50 is disposed corresponding to a joint portion of the robot 1. The display unit 50 according to the present embodiment is disposed on the joint portion of the robot 1 or near the joint portion. The display unit 50 can be formed of any display panel such as a liquid crystal display panel or an organic electro luminescence (EL) display panel. Alternatively, when the display unit 50 changes a color without displaying a character, a figure, or the like, the display unit 50 may be formed of a light such as a plurality of light-emitting diodes.

An operation control unit 31 of the controller 4 includes a display control unit 37 that controls a display of the display unit 50. The display control unit 37 corresponds to a processor of an arithmetic processing device. The processor reads an operation program 41 and performs control determined by the operation program 41, and thus functions as the display control unit 37. The other configuration of the third robot system 8 is similar to that of the first robot system (see FIG. 3).

(Display Unit)

Figure 8:
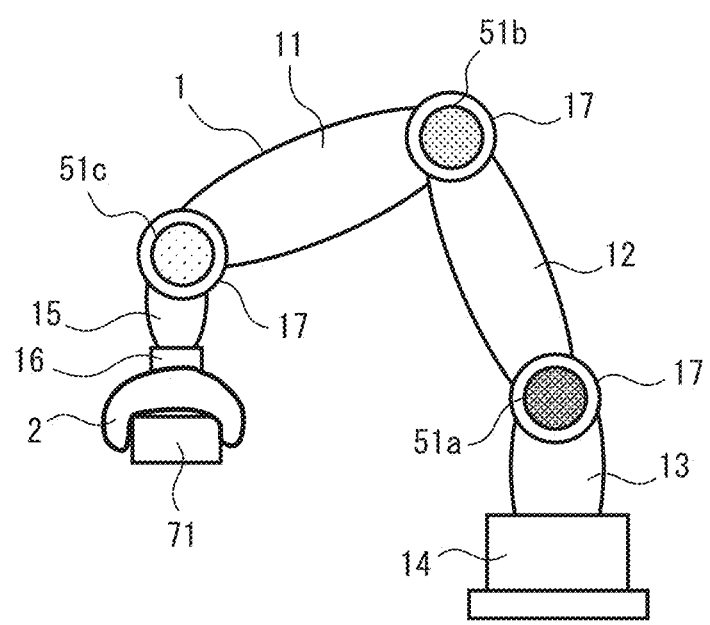
FIG. 8 is a schematic diagram of the robot including a first display unit according to the embodiment.

FIG. 8 illustrates a schematic diagram of the robot including a first display unit according to the embodiment. In the robot 1 illustrated in FIG. 8, first display units 51a to 51c having a circular planar shape are disposed. The first display units 51a to 51c are disposed on each joint portion 17 of the robot 1. The first display units 51a to 51c are formed of a display panel that can display any image such as a character or a pattern.

The display unit can perform display in such a way as to change at least one of a color, a character, a figure, and a pattern, based on at least one of an output value of a temperature detection unit 24 of a torque sensor 20 and a determination result of a sensor temperature determination unit 34. Further, the display unit can change a display according to a value, a determination result, or the like related to a temperature state of the torque sensor.

Further, the display unit is preferably disposed on each joint axis provided with the torque sensor in such a way as to indicate a temperature state of each torque sensor. The display unit is preferably disposed within a range of a distance having a predetermined threshold value from each joint axis provided with the torque sensor. In other words, the display unit is preferably disposed near the joint axis. By adopting this configuration, an operator can easily recognize the joint axis corresponding to information displayed by the display unit.

The display unit can display a value related to a temperature state of the torque sensor, a value related to a determination by the sensor temperature determination unit, or a color, a character, a figure, and a pattern based on the value. The information displayed by the display unit is, for example, a temperature of each torque sensor and a value of a temperature change in the torque sensor in a predetermined time. An interval of the predetermined time may be a control cycle or a time having any length such as every few minutes. Alternatively, the predetermined time may be a timing determined by an operation of the robot, such as an end time of a predetermined operation. Alternatively, the information displayed by the display unit may be a value of each temperature sensor constituting the temperature detection unit, a value of a change in a predetermined time of each temperature sensor, a difference from another temperature sensor when the plurality of temperature sensors are disposed, or a value of a change in terms of time of the difference.

Further, the information displayed by the display unit may be a value related to compensation when a value related to torque is subjected to temperature compensation or a ratio of the value, or a color, a character, a figure, and a pattern based on the value. For example, the information displayed by the display unit may be a value compensating for a value related to torque during temperature compensation, a coefficient by which the value related to the torque during the temperature compensation is multiplied, a coefficient used when the value related to the torque subjected to the temperature compensation during the temperature compensation is calculated, and a coefficient by which a value detected by a displacement detector during the temperature compensation is multiplied.

Further, the information displayed by the display unit may be a value of a coefficient in temperature compensation, a value of a compensated variable such as a difference or a relative ratio when the coefficient is changed by the temperature compensation, or a value that is changed when the temperature compensation is performed and is related to calculation of a value related to torque subjected to the temperature compensation. Further, the information displayed by the display unit may be a color, a character, a figure, and a pattern based on the value. Further, the information displayed by the display unit may be a degree of excellence of a value related to a temperature state of the torque sensor, a degree of excellence of a value related to a determination by the sensor temperature determination unit, a degree of excellence of a determination result of the sensor temperature determination unit, or a degree of excellence of a temperature state of the torque sensor. The display unit preferably displays at least one of a color, a character, a figure, and a pattern while changing at least of them with a lapse of time, based on a value of a variable, a degree of excellence, or the like. Alternatively, the display unit preferably displays a state at a moment of specification.

In the example illustrated in FIG. 8, the first display units 51a to 51c change a color according to a degree of excellence of a temperature state of the torque sensor being obtained by the sensor temperature determination unit. The display unit can change a color in stages in such a way that a color displayed when a temperature state of the torque sensor is a worst state is red.

Figure 9:
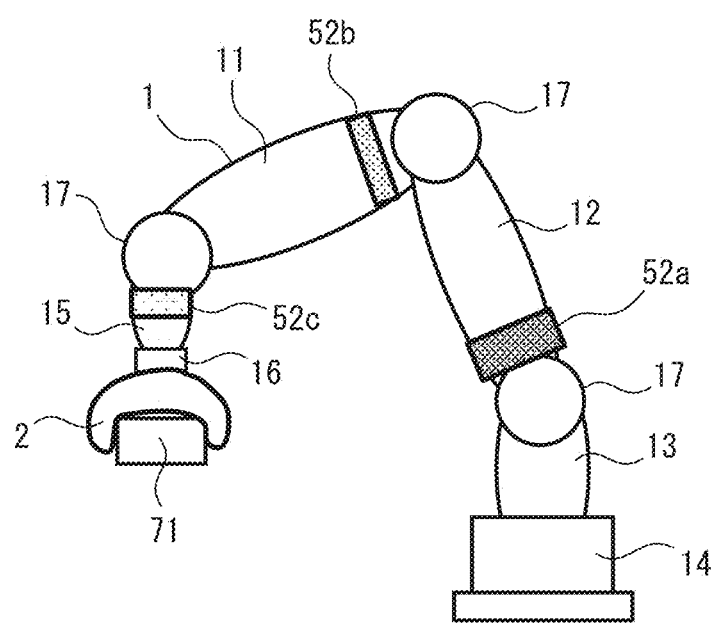
FIG. 9 is a schematic diagram of the robot including a second display unit according to the embodiment.

When the display units 51a to 51c change a color displayed according to a determination result of a temperature state of the torque sensor, the display units 51a to 51c may display green in an excellent state, yellow in a rather bad state, and red in a bad state. The display unit 51a displays red, the display unit 51b displays yellow, and the display unit 51c displays green. Further, the display unit may change brightness according to a temperature state of the torque sensor. For example, the display unit may perform bright display when the temperature state of the torque sensor is a bad state, and perform dark display when the temperature state of the torque sensor is good. FIG. 9 illustrates a schematic diagram of the robot including a second display unit according to the embodiment. In the robot 1 illustrated in FIG. 9, second display units 52a to 52c having a band shape are disposed. The display units 52a to 52c are disposed near the joint portion 17 in which the torque sensor is disposed. The display units 52a to 52c are disposed on a constituent member of the robot in which the torque sensor disposed corresponding to the joint axis can detect torque. The display units 52a to 52c are formed around the constituent member such as an upper arm 11. The display units 52a to 52c are wrapped around the constituent member in such a way as to extend in a circumferential direction of the constituent member.

In the example illustrated in FIG. 9, similarly to FIG. 8, the display units 52a to 52c change a displayed color according to a determination result of a temperature state of the torque sensor. By adopting the second display units 52a to 52c having a shape surrounding the constituent member of the robot 1, an operator can view the display units 52*a* to 52*c* from various directions. Even when the robot 1 changes a position and a posture, an operator can confirm a display of the display units 52*a* to 52*c*.

Figure 10:
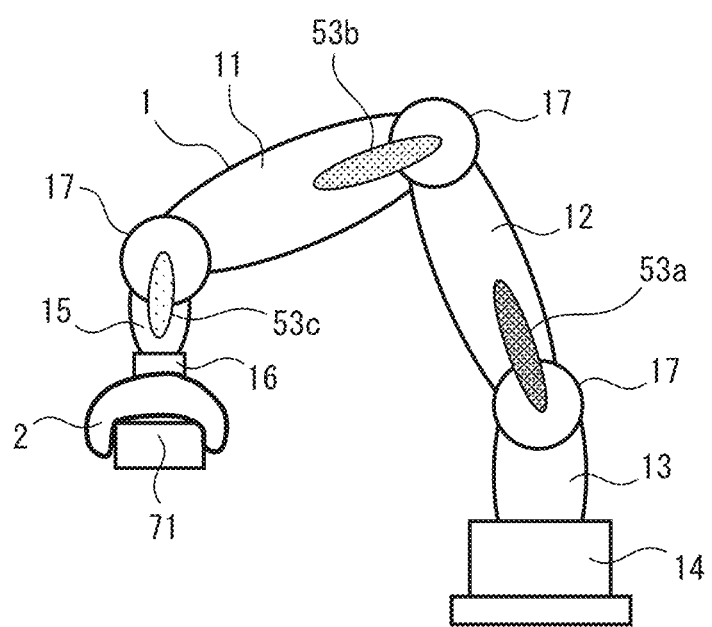
FIG. 10 is a schematic diagram of the robot including a third display unit according to the embodiment.

FIG. 10 illustrates a schematic diagram of the robot including a third display unit according to the embodiment. In the robot 1 illustrated in FIG. 10, third display units 53*a* to 53*c* having an extending elongated shape are disposed. The display units 53*a* to 53*c* may be disposed within a range of a predetermined distance from the joint axis provided with the torque sensor. The display units 53*a* to 53*c* are disposed near each joint axis provided with the torque sensor.

Each of the display units 53*a* to 53*c* is disposed in such a way as to extend from the joint axis toward a constituent member of the robot in which the torque sensor can detect torque. For example, the display unit 53*a* is disposed corresponding to the torque sensor that detects torque when a lower arm 12 is driven. The display unit 53*a* is disposed in such a way as to extend from the joint portion 17 between the lower arm 12 and a turning base 13 toward the lower arm 12. The display unit 53*a* moves together with the lower arm 12. In the example herein, similarly to FIG. 8, the display units 53*a* to 53*c* change a displayed color according to a determination result of a temperature state of the torque sensor. Note that, when a direction in which the torque sensor detects torque is around a central axis of an arm (link) connecting adjacent joint axes, the display unit may be formed around the joint portion.

Figure 11:
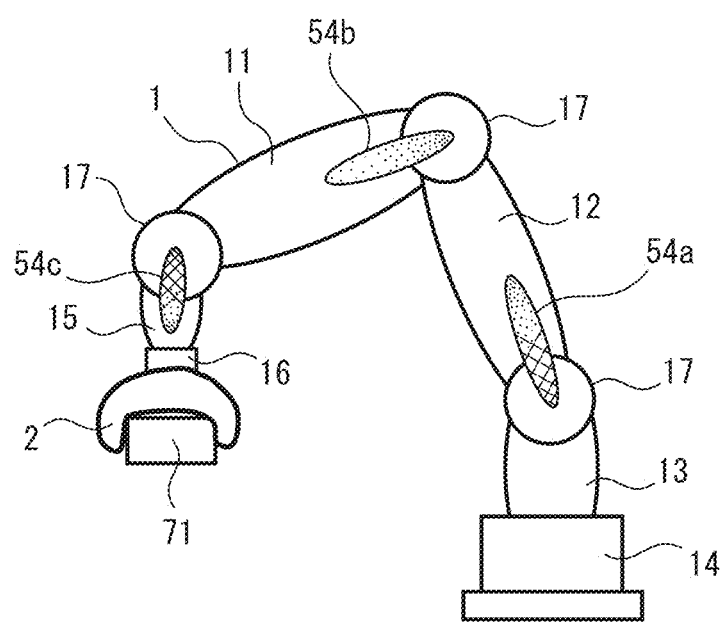
FIG. 11 is a schematic diagram of the robot including a fourth display unit according to the embodiment.

FIG. 11 illustrates a schematic diagram of the robot including a fourth display unit according to the embodiment. In the robot 1 illustrated in FIG. 11, fourth display units 54*a* to 54*c* having an extending elongated shape are disposed. Shapes and disposed positions of the fourth display units 54*a* to 54*c* are similar to those of the third display units 53*a* to 53*c*. The display units 54*a* to 54*c* may be disposed within a range of a predetermined distance from the joint axis provided with the torque sensor.

The fourth display units 54*a* to 54*c* include two or more regions that perform display in such a way as to change at least one of a color, a character, a figure, and a pattern, based on at least one of an output value of the temperature detection unit of the torque sensor and a determination result of the sensor temperature determination unit. When the display units 54*a* to 54*c* display two pieces of information, the display units 54*a* to 54*c* can be disposed in such a way as to extend from near the center of the joint portion toward a constituent member in which the torque sensor can detect torque.

The display units 54*a* to 54*c* can display a color according to magnitude of a temperature of the torque sensor for one portion on a side closer to the joint axis. For example, a color according to magnitude of a temperature is displayed in such a way as to display blue at a low temperature of the torque sensor and display red at a high temperature. For the other portion on a side farther from the joint axis (portion of the display unit on a side toward a tip of the robot), a color according to a degree of excellence of a state related to temperature compensation of the torque sensor can be displayed. For example, blue is displayed when temperature compensation is in a good state, and red is displayed when the temperature compensation is in a bad state. For a state between the good state and the had state, a color according to a degree of excellence of a state related to the temperature compensation of the torque sensor is displayed.

Further, a color based on an output value or a determination result may be displayed on the other portion on a side opposite to a side on which the joint axis is disposed, and a numerical value based on a different output value or a different determination result may be displayed on the color. Further, as a different display example, in such a way as to indicate a plurality of states in the display unit, a character such as a value related to a different state of a temperature state of the torque sensor may be displayed on a portion in which a color or a pattern according to a state related to the temperature state of the torque sensor is displayed.

(Example of Image Displayed by Display Unit)

Next, a specific example of an image displayed on the display unit will be described with reference to FIGS. 12 to 19. FIGS. 12 to 19 illustrate a display unit 55 having a circular planar shape and being disposed on the joint portion 17 similarly to the first display units 51*a* to 51*c* in FIG. 8. Further, a scene where a display of the display unit 55 changes from a good temperature state of the torque sensor to a bad temperature state of the torque sensor is illustrated. In each diagram, an image of a good temperature state, an image of a rather had state, and an image of a bad temperature state are illustrated.

The display unit 55 is formed of a display panel that can display any image, such as a liquid crystal display panel. The display unit 55 can display at least one of a color, a character, a figure, and a pattern. With reference to FIG. 7, the display control unit 37 of the operation control unit 31 controls an image displayed on the display unit 50, based on the operation program 41.

Figure 12:
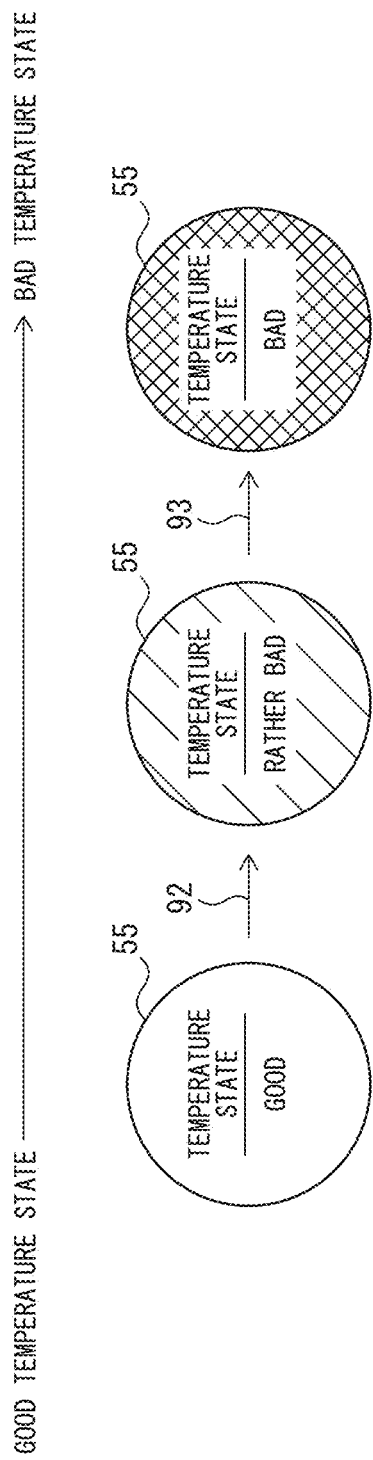
FIG. 12 is a first image displayed on the display unit according to the embodiment.

FIG. 12 illustrates a first image displayed on the display unit. When a temperature state of the torque sensor is good, the display unit 55 displays a good temperature state on a green background. As the temperature state becomes rather bad, the image changes as indicated by an arrow 92. When the temperature state is rather bad, the display unit 55 displays a rather bad temperature state on a yellow background. Furthermore, as the temperature state becomes bad, the image changes as indicated by an arrow 93. When the temperature state is bad, the display unit 55 displays a bad temperature state on a red background.

In this way, the display unit 55 can display any information such as a temperature state or a determination result of the torque sensor by a character. Further, the display unit can display a character in combination with a color. The display unit 55 is disposed on each joint portion. Then, the display unit 55 can change a display in such a way as to indicate a state of the joint portion on which the display unit 55 is disposed. An operator can recognize a state of each joint portion by viewing the display of the display unit 55 disposed on the joint portion.

Figure 13:
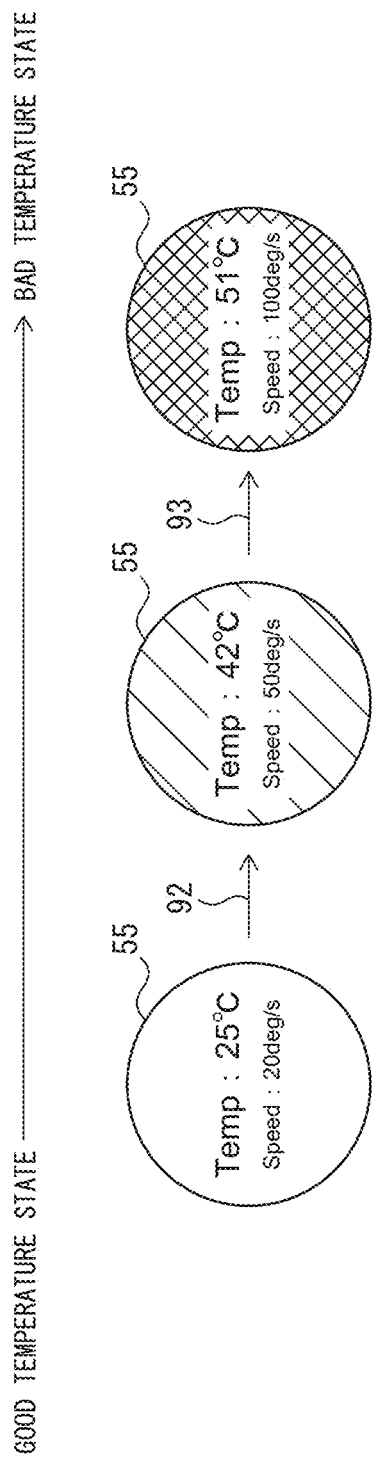
FIG. 13 is a second image displayed on the display unit according to the embodiment.

FIG. 13 illustrates a second image displayed on the display unit. In the second image, a temperature of the torque sensor 20 and a rotational speed of a robot driving motor 19 are displayed over a color corresponding to a temperature state of the torque sensor 20. When a temperature state of the torque sensor 20 is good, the display unit 55 displays a temperature of 25° C. and a rotational speed of 20 deg/s on a green background. As the temperature state becomes rather bad, the display changes as indicated by an arrow 92. A temperature of 42° and a rotational speed of 50 deg/s are displayed over a yellow background. Furthermore, as the temperature state becomes bad, the display changes as indicated by an arrow 93. A temperature of 51° C. and a rotational speed of 100 deg/s are displayed over a red background. In this way, a variable such as a temperature of the torque sensor and a speed of the robot driving motor may be displayed as a numerical value.

Figure 14:
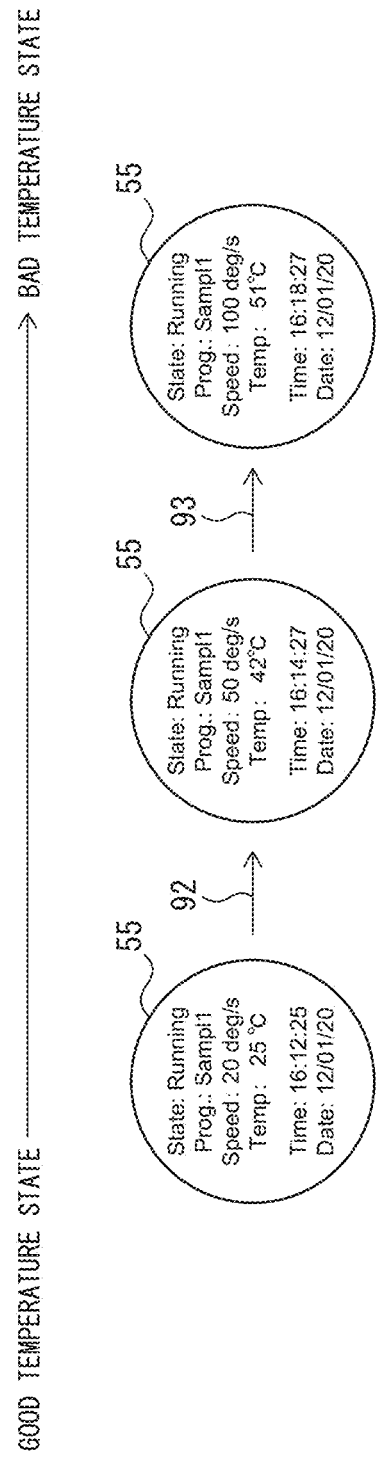
FIG. 14 is a third image displayed on the display unit according to the embodiment.

FIG. 14 illustrates a third image displayed on the display unit. In the third image, the display unit 55 displays various types of information in addition to a temperature of the torque sensor and a rotational speed of the robot driving motor. In the third image, information (State) about whether the robot driving motor is driven, a name (Prog.) of an executing operation program, a time, and a date are displayed. In this way, the display unit 55 can display any information related to driving of the robot 1, work of the robot 1, or the like. Further, the display unit 55 may be formed in such a way that an operator can select an item displayed on the display unit 55 by a command statement and the like of an operation program.

Figure 15:
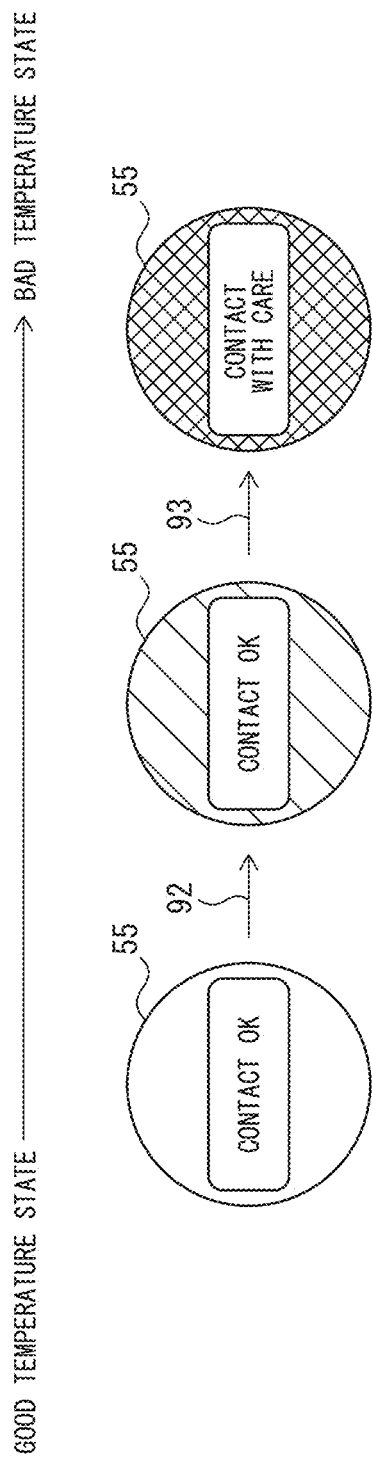
FIG. 15 is a fourth image displayed on the display unit according to the embodiment.

FIG. 15 illustrates a fourth image displayed on the display unit. When an operator performs teaching work by direct teaching and performs cooperation work with the robot, the operator comes into direct contact with the robot. The fourth image can be displayed when the operator comes into direct contact with the robot. In the fourth image, a background color is changed according to a temperature of the torque sensor.

When a temperature state of the torque sensor is good and rather bad, the joint portion has a temperature that the operator does not feel hot on contact, and thus it is displayed that contact may be made. When the temperature state of the torque sensor is bad, the joint portion has a temperature that the operator feels hot on contact, and thus it is displayed that care needs to be taken. The operator can recognize whether care needs to be taken when the operator comes into contact with the joint portion by viewing the display of the display unit 55. Note that the display unit 55 may perform display that prohibits contact by the operator when the temperature state of the torque sensor further becomes worse.

Figure 16:
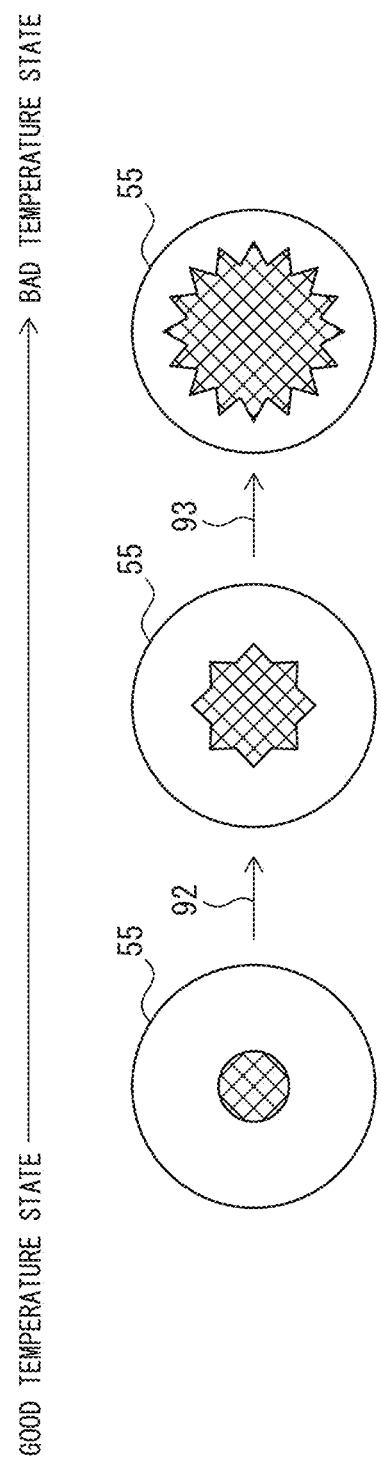
FIG. 16 is a fifth image displayed on the display unit according to the embodiment.

FIG. 16 illustrates a fifth image displayed on the display unit. In the fifth image, the display unit 55 displays a pattern. The pattern is changed according to a temperature state of the torque sensor. When the temperature state is good, a small colored pattern is displayed. As indicated by an arrow 92 and an arrow 93, it is displayed that the pattern is larger and the number of irregularities further increases as the temperature state becomes worse. The operator can easily recognize the temperature state of the torque sensor, based on a size and a shape of the pattern displayed on the display unit 55.

Figure 17:
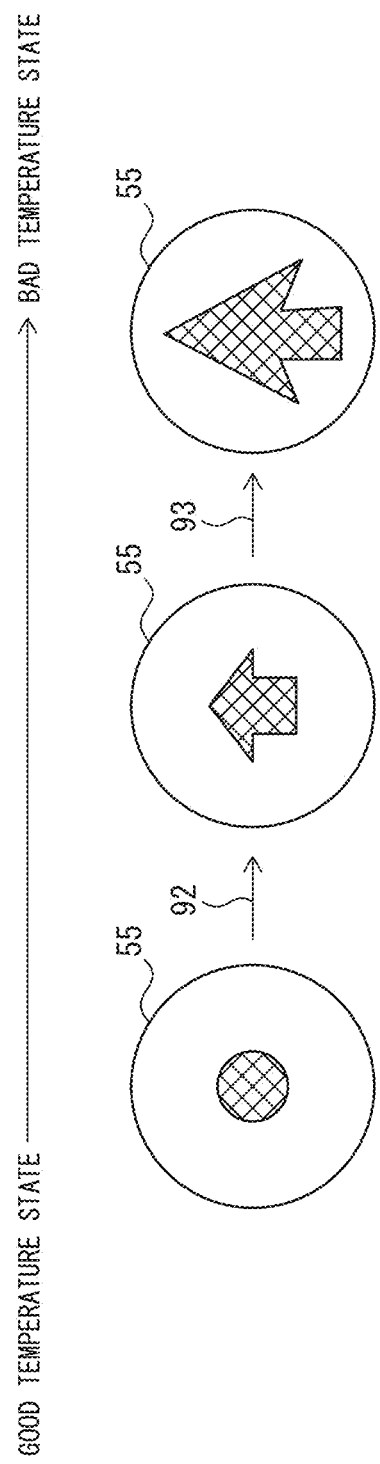
FIG. 17 is a sixth image displayed on the display unit according to the embodiment.

FIG. 17 illustrates a sixth image displayed on the display unit. In the sixth image, a figure is changed according to a temperature state of the torque sensor. In the sixth image, when the temperature state of the torque sensor is good, a circular figure is illustrated. When the temperature state changes as indicated by an arrow 92 and the temperature state of the torque sensor is rather bad, an arrow figure is illustrated. As indicated by an arrow 93, when the temperature state further becomes worse, a larger arrow figure is displayed. In this way, the display unit 55 may change a shape of a figure according to a temperature state of the torque sensor of the joint portion.

Figure 18:
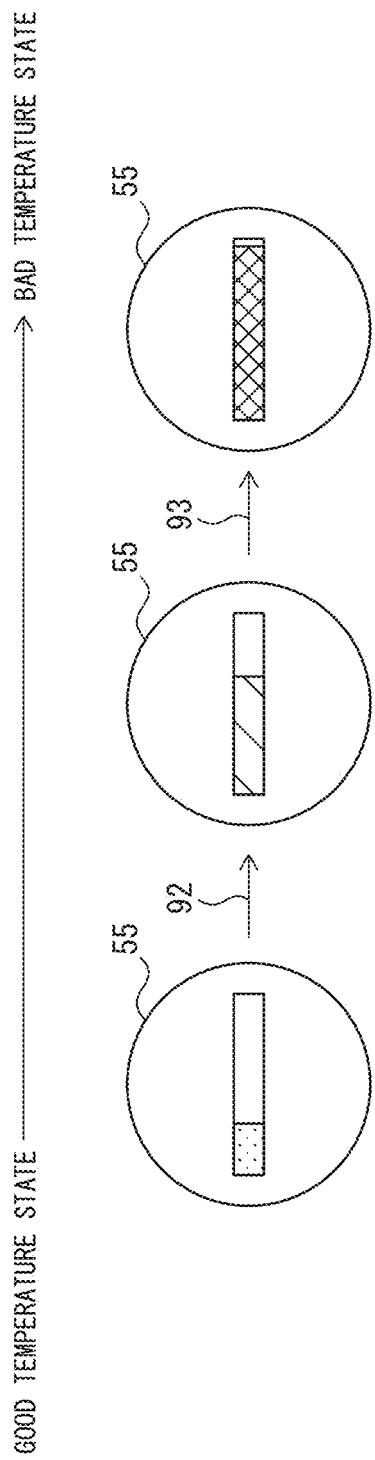
FIG. 18 is a seventh image displayed on the display unit according to the embodiment.

FIG. 18 illustrates a seventh image displayed on the display unit. In the seventh image, a pattern is changed according to a temperature state of the torque sensor. In the image illustrated in FIG. 18, a bar-shaped indicator extending in a horizontal direction is displayed. As the temperature state of the torque sensor becomes worse as indicated by arrows 92 and 93, the image changes in such a way that the indicator rises. Further, a pattern inside the indicator changes according to deterioration of the temperature state of the torque sensor. As deterioration of the temperature state, a dot pattern is changed to a pattern with oblique lines as indicated by the arrow 92, and the pattern with the oblique lines is changed to a mesh pattern as indicated by the arrow 93. Further, a displayed color may be changed with a length of the indicator.

Figure 19:
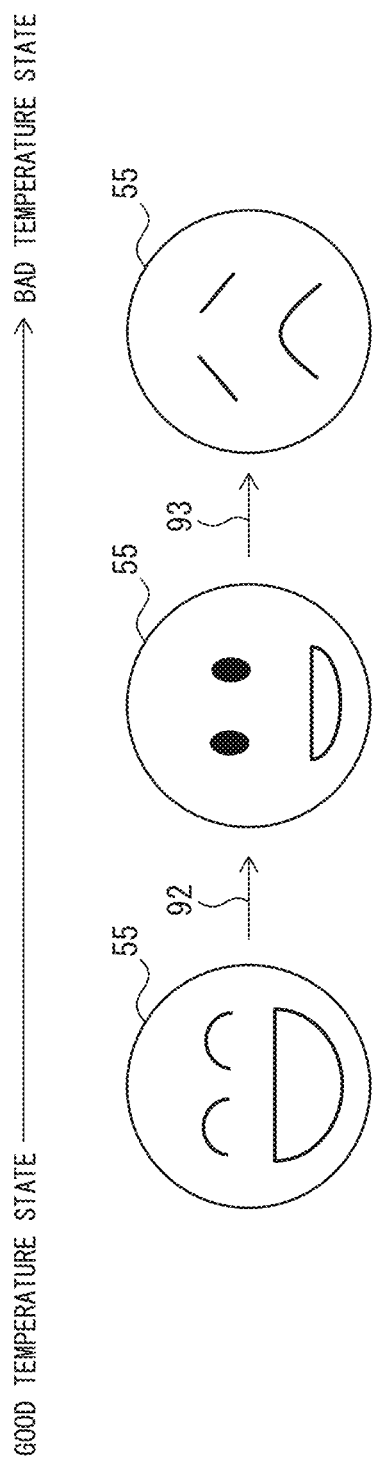
FIG. 19 is an eighth image displayed on the display unit according to the embodiment.

FIG. 19 illustrates an eighth image displayed on the display unit. The eighth image displays a figure of a shape by using an outline of the display unit 55. An expression of the face is changed according to a temperature state of the torque sensor. As the temperature state of the torque sensor becomes worse as indicated by arrows 92 and 93, the image changes in such a way that the expression of the face becomes worse. Further, a displayed color may be changed according to the expression of the face.

(Effect of Third Robot System)

In the third robot system 8, the display unit 50 that displays a temperature state of the torque sensor 20 included in the joint portion 17 of the robot 1 is disposed in the joint portion 17 in which the torque sensor 20 is disposed or near the joint axis 17. By adopting this configuration, a temperature state of the torque sensor included in the joint axis of the robot or a temperature state of the joint portion can be intuitively recognized. Alternatively, an operator can intuitively recognize a situation of temperature compensation of torque data of the torque sensor included in the joint axis of the robot, or a situation of detection accuracy and the like of torque by displaying the situation.

Further, even when an operator comes into contact with the robot, the operator can recognize, in advance, that a portion to be contacted by the operator has an unexpected temperature, or detection accuracy of the torque sensor is decreasing. For example, the operator may avoid contact with a joint portion at a high temperature, and come into contact with a different joint portion.

The embodiments described above give the example in which a temperature state of the torque sensor becomes worse as a temperature of the torque sensor increases, but the embodiments are not limited to this form. As a temperature of the torque sensor decreases, a temperature state of the torque sensor may become worse. For example, when a temperature of a place where the robot is disposed is too low, a temperature of the torque sensor may be extremely low. As a result, an error of torque data output from the torque sensor may be increased. In this case, an abnormal state having a temperature lower than that in an appropriate temperature state can be set for a temperature state of the torque sensor. Further, similarly to the embodiments described above, when a temperature state of the torque sensor is neither an appropriate temperature state nor an abnormal state, the control for reducing at least one of a speed and acceleration of the robot driving motor of the joint axis in which the torque sensor is disposed can be performed.

The embodiments described above can be appropriately combined. In each control described above, an order of steps can be appropriately changed within a range in which functions and action are not changed.

In each of the drawings described above, the same or similar portion has the same reference sign. Note that the embodiments described above are exemplifications, and do not limit the invention. Further, the embodiments include a change in the embodiments indicated in claims.

REFERENCE SIGNS LIST

1 Robot
4 Controller
6, 7, 8 Robot system
17 Joint portion

18 Rotational position detector
19 Robot driving motor
20 Torque sensor
21 Displacement detector
22 Temperature sensor
23 Torque detection unit
24 Temperature detection unit
25a Entry detection device
25b Exit detection device
32 Conversion unit
33 Temperature compensation unit
34 Sensor temperature determination unit
35 Operation mode setting unit
36 Switching timing setting unit
42 Storage unit
43 Operation command unit
50 Display unit
51a, 51b, 51c Display unit
52a, 52b, 52c Display unit
53a, 53b, 53c Display unit
54a, 54b, 54c Display unit
55 Display unit

The invention claimed is:

1. A robot system including a robot including a torque sensor corresponding to a joint axis, the robot system comprising:
a torque sensor including a torque detection unit and a temperature detection unit;
a processor configured to
obtain data subjected to temperature compensation, based on an output value of the torque detection unit and an output value of the temperature detection unit,
determine whether a temperature state of a torque sensor is an abnormal state and whether a temperature state of a torque sensor is an appropriate temperature state, based on at least one of an output value of the temperature detection unit and the obtained data subjected to temperature compensation,
change an operation command in such a way as to stop the robot when there is a torque sensor in which a temperature state of a torque sensor is an abnormal state, and
change, when there is a torque sensor in which a temperature state of a torque sensor is neither an abnormal state nor an appropriate temperature state, an operation command of the robot in such a way as to reduce at least one of a speed and acceleration of a joint axis in which the torque sensor is disposed.

2. The robot system according to claim 1 for driving the robot configured to detect torque acting on the robot by a torque sensor included in a joint axis of the robot, wherein the robot system includes:
the robot including two or more joint axes including a torque sensor, and being formed of a plurality of joint axes;
the processor configured to output an operation command of the robot for driving the robot; and
a torque sensor included in a joint axis of the robot, and including the torque detection unit configured to detect torque acting on a torque sensor and the temperature detection unit configured to detect a temperature state of a torque sensor;
the processor is configured to obtain torque data subjected to temperature compensation, based on an output value of the torque detection unit and an output value of the temperature detection unit;
the processor is configured to
determine whether a temperature state of a torque sensor is an abnormal state by using an abnormal state determination condition formed of at least one determination condition of a determination condition of a comparison between an output value of the temperature detection unit and a predetermined threshold value, a determination condition of a comparison between a value of a change of an output value in a predetermined time of the temperature detection unit and a predetermined threshold value, a determination condition of a comparison between a compensation value of torque data subjected to temperature compensation and a predetermined threshold value, and a determination condition of a comparison between an output value of the temperature detection unit and an output value of the temperature detection unit in a torque sensor included in another joint axis of the robot, and a determination value of a predetermined determination condition, and
further determine, when a temperature state of a torque sensor is not an abnormal state, whether a temperature state of a torque sensor is an appropriate temperature state by using an appropriate temperature state determination condition formed of at least one different determination condition of separately prepared determination conditions, and a different predetermined determination value,
the processor changes and outputs an operation command in such a way as to stop the robot when there is a torque sensor determined by the processor that a temperature state of a torque sensor is an abnormal state, and
when there is no torque sensor determined that a temperature state of a torque sensor is an abnormal state, control is performed for changing a predetermined operation command of the robot in such a way that at least one of a speed and acceleration of a joint axis provided with a torque sensor determined not to be in an appropriate temperature state is equal to or less than a predetermined value, or control is performed for changing a predetermined operation command of the robot in such a way that at least one of a speed and acceleration of a joint axis provided with a torque sensor determined not to be in an appropriate temperature state is multiplied by a predetermined proportion and set smaller.

3. The robot system according to claim 2, wherein the processor is configured to
set an appropriate temperature mode as a mode of driving the robot to an effective state or an ineffective state,
set a timing for switching the appropriate temperature mode to an effective state or an ineffective state, and
set the appropriate temperature mode to an effective state or an ineffective state at a predetermined timing based on the setting.

4. The robot system according to claim 3, wherein the processor is configured to set, as a timing for switching the appropriate temperature mode to an effective state or an ineffective state, a timing such as a timing after the robot performs a predetermined operation, a timing before the robot performs a predetermined operation, a predetermined time, a timing before or after a predetermined time from when the robot starts a predetermined operation, a timing after or before a predetermined time from when the robot ends a predetermined operation, or a timing at which a predetermined signal is input or disconnected.

5. The robot system according to claim 3, wherein the processor is configured to set the timing for switching the appropriate temperature mode to an effective state or an ineffective state based on a relationship between an operation in a joint axis provided with a torque sensor during an operation of the robot and a temperature state of a torque sensor, in such a way that a temperature state of a torque sensor is an appropriate temperature state after the robot performs a predetermined operation, before the robot performs a predetermined operation, or at a predetermined time.

6. The robot system according to claim 3, further comprising:
an entry detection device configured to detect that an operator enters or has entered a predetermined region where the robot is driven,
wherein the processor is configured to set the appropriate temperature mode to an effective state at a timing at which the entry detection device detects that an operator enters or has entered a predetermined region where the robot is driven.

7. The robot system according to claim 3, further comprising:
an exit detection device configured to detect an operator exits or has exited from a predetermined region where the robot is driven,
wherein the processor is configured to set the appropriate temperature mode to an ineffective state at a timing at which the exit detection device detects that an operator exits or has exited from a predetermined region where the robot is driven.

8. The robot system according to claim 1, wherein the processor is configured to use a determination condition and a determination value according to a portion of a joint axis provided with a torque sensor, in a determination whether a temperature state of a torque sensor is an abnormal state or whether a temperature state of a torque sensor is an appropriate temperature state.

9. The robot system according to claim 1, wherein, in a determination on whether a temperature state of a torque sensor is an abnormal state or whether a temperature state of a torque sensor is an appropriate temperature state,
the processor is configured to
obtain a degree of excellence of a temperature state of a torque sensor, based on at least one value of an output value of the temperature detection unit and a value according to temperature compensation of torque data, and
use a determination condition of a comparison between a degree of excellence of a temperature state of a torque sensor and a predetermined threshold value, and a determination value.

10. The robot system according to claim 1, wherein, in a determination on whether a temperature state of a torque sensor is an abnormal state or whether a temperature state of a torque sensor is an appropriate temperature state,
the processor is configured to
obtain, as a degree of excellence of a temperature state of a torque sensor, a value obtained by substituting an output value of the temperature detection unit, a value of a change of an output value in a predetermined time of the temperature detection unit, and, as a value according to temperature compensation of torque data, a value in which temperature compensation is performed on detected torque data or a coefficient according to temperature compensation for detected torque data into a predetermined polynomial, and
use a determination condition of a comparison between a degree of excellence of a temperature state of a torque sensor and a predetermined threshold value, and a determination value.

11. The robot system according to claim 9, wherein the processor is configured to
perform control for changing a predetermined operation command of the robot in such a way that at least one of a speed and acceleration of a joint axis provided with a torque sensor determined not to be in an appropriate temperature state is equal to or less than a predetermined value according to a degree of excellence of a temperature state of a torque sensor, or
perform control for changing a predetermined operation command of the robot in such a way that at least one of a speed and acceleration of a joint axis provided with a torque sensor determined not to be in an appropriate temperature state is multiplied by a predetermined proportion according to a degree of excellence of a temperature state of a torque sensor and set smaller.

12. The robot system according to claim 1, wherein, in a case where at least one of a speed and acceleration of a joint axis provided with a torque sensor determined not to be in an appropriate temperature state is reduced with respect to a predetermined operation command of the robot, when there are a plurality of joint axes provided with a torque sensor determined not to be in an appropriate temperature state,
the processor is configured to
change, when a speed of a joint axis provided with a torque sensor determined not to be in an appropriate temperature state is reduced, an operation command of the robot in such a way as to reduce a speed of all joint axes with respect to a predetermined operation of the robot for all joint axes of the robot by using a smallest value of a ratio that reduces a speed of a joint axis provided with a torque sensor determined not to be in an appropriate temperature state, and
change, when acceleration of a joint axis provided with a torque sensor determined not to be in an appropriate temperature state is reduced, an operation command of the robot in such a way as to reduce acceleration of all joint axes with respect to a predetermined operation of the robot for all joint axes of the robot by using a smallest value of a ratio that reduces acceleration of a joint axis provided with a torque sensor determined not to be in an appropriate temperature state.

13. The robot system according to claim 1, wherein the robot includes a display unit configured to perform display in such a way as to change at least one of a color, a character, a figure, and a pattern, based on at least one of an output value of the temperature detection unit and a determination result of the processor, and
the display unit is disposed within a predetermined maximum distance to a joint axis with a torque sensor.

14. The robot system according to claim 9, wherein the robot includes a display unit configured to change a color in stages in such a way that a color displayed when a temperature state of a torque sensor is a bad state is red according to a degree of excellence of a temperature state of a torque sensor being obtained, and the display unit is disposed within a predetermined maximum distance to a joint axis with a torque sensor.

* * * * *